United States Patent [19]
Kramer

[11] 3,762,160
[45] Oct. 2, 1973

[54] HIGH VELOCITY THRUST ACTUATOR
[76] Inventor: Kurt H. Kramer, 601 West Ave., Sewaren, N.J.
[22] Filed: Oct. 6, 1971
[21] Appl. No.: 186,852

[52] U.S. Cl.............................. 60/10.5, 91/5, 91/25
[51] Int. Cl.......................... F15b 7/00, F15b 21/00
[58] Field of Search....................... 91/392, 165, 25, 91/5; 60/54.4 HA, 62.5, 10.5, 54.6 HA, 62.6

[56] References Cited
UNITED STATES PATENTS
| | | | |
|---|---|---|---|
| 2,931,218 | 4/1960 | Ottestad.............................. | 60/10.5 |
| 2,979,938 | 4/1961 | Ottestad.............................. | 60/10.5 |
| 3,267,677 | 8/1966 | Bollar............................. | 60/54.5 HA |
| 3,352,143 | 11/1967 | Bollar....................................... | 91/5 |
| 3,363,512 | 1/1968 | Ottestad.............................. | 91/392 |

Primary Examiner—Paul E. Maslousky
Attorney—Charles L. Lovercheck

[57] ABSTRACT

The specification discloses a high velocity thrust actuator comprising a piston chamber which is operated by a hydraulic power unit. The piston chamber is adapted to suddenly produce a large thrust and stroke very rapidly for the purpose of hammering and impact. The sudden thrust is created by releasing high pressure gas onto the face of the piston means. To reset the piston chamber before each impact stroke the power unit pumps hydraulic fluid into the chamber to compress the pressure gas. This done, the hydraulic fluid is evacuated from the piston chamber and the piston can then stroke.

23 Claims, 5 Drawing Figures

INVENTOR.
KURT H. KRAMER

INVENTOR.
KURT H. KRAMER

HIGH VELOCITY THRUST ACTUATOR

REFERENCE TO RELATED APPLICATION

Some of the material in this disclosure is also shown in co-pending application, Ser. No. 170,599 wherein FIG. 15 shows the present invention used on a forging press.

REFERENCE TO PRIOR ART

The early piston chamber type actuators in this art are used primarily as shock testing devices to exert controlled and sudden thrusts on specimen components. The chambers contain a body of pressure gas, a piston having a thrust shaft and seal or valve means for isolating the pressure gas from the face of the piston. Elimination of the seal or the opening of the valve means releases the pressure gas onto the face of the shaft piston producing a sudden acceleration, which is exerted on the test component attached to the thrust shaft outside the chamber. In testing work such as this, there is no need for the piston chambers to cycle and stroke at high frequency. As a result, only the most elementary provision is made for resetting and recycling these early piston chambers, namely, that of bleeding off the pressure gas so that the shaft piston can move inward into the chamber until the piston face is again isolated by valve or seal means. New pressure gas is then filled into the chamber to replenish the gas bled off.

High pressure gas in the range of 2,000 psi is very expensive, and rapid cycling of piston chambers by this bleed and refill method is not practical. This art contains several means by which piston chambers can be reset rapidly to perform production impact work without the bleed off and loss of most of the pressure gas on each stroke.

One such means has been applied to piston chambers shown in U.S. Pat. No. 3,093,118. It consists of a hydraulic power unit which is connected through hoses or piping to hydraulic jacking pistons. These jacking pistons are arranged externally to the piston chamber and are adapted to push the thrust shaft back into the chamber after each impact stroke. As the thrust shaft and piston moved inward, the pressure gas is compressed back to its original volume and pressure before each stroke. Next, the face of the shaft piston is isolated by seal means and pressure reducing means from the chamber pressure gas to that the pressure gas is momentarily prevented from urging the shaft piston outward. The hydraulic power unit retracts the hydraulic jacks back out of the way of the thrust shaft's travel and the device is ready for another impact stroke. This recycling means is simple but cumbersome. Some sort of framing or yoke must be fixed external to the chamber to hold the jacks. This gives the impact unit a large size compared with its stroke energy capability. Also, the thrust shaft must be pushed back into the chamber each time to the very beginning of its mechanical stroke in order for the shaft piston to engage the seal means, and the shaft stroke cannot be varied from this beginning stroke point. If the work piece is not repositioned closer or farther from the chamber, the thrust shaft must move through the same distance to stroke the work each time. The stroking energy which equals the gas force multiplied by the stroke distance thus cannot be varied from stroke to stroke, except by the impractical process of changing the pressure of the gas by bleeding and filling. Another drawback to this system is the risk that if a stroke occurs accidentally before the jacks have completely retracted, then the shaft will impact the jacks instead of the workpiece. Hydraulic pressure intensification from such an impact could cause bursting of the power unit components along with shrapnelling of the jacking pistons themselves.

Another reset means in the prior art is shown in U.S. Pat. No. 3,135,140 and has been also applied to U.S. Pat. No. 3,093,117. This means also uses a hydraulic power unit and functions similarly to the esternal hydraulic jacking approach. In this case, however, the hydraulic jacking means is incorporated within the piston chamber itself. The chamber unit, as a result, is much more compact with a high energy capability for its size. In this arrangement, an additional floating piston reciprocates along with the shaft piston means in the bore of the chamber. This floating piston is located on the side in front of the shaft piston means as the shaft strokes. If the shaft piston is adapted with a thrust shaft which moves outward from the chamber during an impact stroke, then this shaft passes through the floating piston and exits the chamber at the floating piston end. The floating piston here as applied to U.S. Pat. No. 3,093,117 is a ring shaped member surrounding the shaft. If the thrust shaft attached to the shaft piston is adapted to pull inward into the chamber during an impact stroke as in U.S. Pat. No. 3,135,140, then the shaft exists the other end of the chamber and does not pass through the floating piston. The floating piston is here a solid disc shaped element. In each case, the floating piston segregates two spaces within the chamber—the space between itself and the shaft piston means, and the space between itself and the end of the chamber. One of these spaces is charged with cushion gas. The other space is connected through hose or piping means with the remote power unit which is adapted to expand and contract the space filling and evacuating it of hydraulic fluid.

Operation is the same as with the external jacks. During an impact stroke, the shaft piston moves toward the floating piston end of the chamber. After the stroke, the power unit pumps hydraulic fluid into the chamber expanding the space in front of the shaft piston and urging it back towards the beginning stroke position. As the shaft piston moves back the main body of pressure gas is recompressed to its initial volume. Once the face of the shaft piston means is sealed off from the main pressure gas, a power unit valve operates to evacuate the expanded hydraulic region in the chamber. The cushion gas will serve to hold the shaft piston in its sealed off position while at the same time acting on the floating piston to push the hydraulic fluid out of the chamber back to the power unit tank. Evacuating the hydraulic fluid in this manner leaves cushion gas filled space in front of the shaft piston through which it can thrust for an impact stroke.

Theoretically, in this arrangement the energy of the impact stroke can be varied using the power unit control. Varying the amount of hydraulic fluid left within the chamber during the thrust shaft's stroke varies the end of stroke point limiting the distance the shaft is able to stroke. There are several difficulties, however. Since evacuating the hydraulic fluid is accompanied only by floating piston movement within the chamber, there is no visual sign outside the chamber or power unit—no thrust shaft motion, for example—by which the fluid volume being exhausted can be monitored and shut off by the power unit. Exact energy control is therefore difficult. Also, the thrust shaft always starts its impact stroke from the same beginning stroke position and only the end point of the stroke can be varied. To benefit from varying energy strokes, the workpiece must be repositioned closer or farther from the piston chamber each time the energy is changed. The main problem, however, is safety since hydraulic fluid can be left in the chamber in way of the shaft piston's impacting stroke. The machine can accidentally misfire or stroke when a workpiece is absent. In such a case there is nothing to stop the shaft piston but the cushion gas and hydraulic fluid left within the chamber. To absorb the thrust shaft's energy and halt its motion, the pressure of the cushion gas and the hydraulic fluid intensifies to very high levels which cannot be sustained by conventional hydraulic power unit systems. There is thus a danger of bursting the equipment and harming the personnel.

There is another hydraulic control system in this art which does not confine hydraulic fluid in the path of the stroking shaft piston. U.S. Pat. No. 3,363,512 shows a piston chamber device in which the hydraulic fluid used to reset the piston is confined to the rear of the piston chamber means as the piston strokes. If the piston fails to impact a workpiece, it will be safely halted by cushion gas alone confined in front of the shaft piston means.

In this arrangement, the main pressure gas is isolated in a space within the piston chamber in a manner which prevents the pressure gas from acting directly on the face of the shaft piston means. The pressure gas must act instead indirectly through an accumulator type piston pressurizing the hydraulic fluid which in turn communicates over the end face of the shaft piston means. After each impact stroke, the shaft piston is returned to its beginning stroke position and the pressure gas is recompressed to its initial volume in two separate steps. First, the power unit valve is switched to exhaust hydraulic fluid from the chamber. The cushion gas urges the shaft piston means to move inward into the chamber and displace hydraulic fluid out of the chamber back to the power unit reservoir tank. When the shaft piston has returned to its beginning position, it sealingly engages the back wall of the chamber causing the hydraulic fluid pressurized by the main pressure gas to be sealed off from communication over most of the shaft piston face. The hydraulic fluid is thus restrained from urging the shaft piston outward, and the power unit can now pump hydraulic fluid into the chamber expanding the volume of this sealed off hydraulic region and simultaneously recompressing the main pressure gas. The energy of the ensuing stroke is determined and varied at this point by how much the power unit hydraulically recompresses the pressure gas. Elimination of the seal between the shaft piston and chamber wall permits the gas pressurized hydraulic fluid onto the face of the shaft piston urging the piston outward in an impact stroke.

As in the cases discussed above, the beginning stroke position of the piston is fixed. Only the end point of the shaft piston's stroke is varied as the amount of hydraulic fluid pumped into the chamber and the amount of energy stored in the pressure gas is varied.

Again, to fully benefit from varying energy strokes, the distance between the piston chamber and the workpiece should also simultaneously vary.

The main drawback to the system just discussed, however, is its rather low energy capability compared with the piston chamber's size. In general, increased pressure gas volume provides more extended gas expansion with less of a pressure drop off, e.g., more energy of expansion. Therefore, the greater the volume of pressure gas a piston chamber contains, the greater will be its stroking energy. The system just cited works against this rule. Increased stroking energy is provided for by the power unit's pumping increased amounts of hydraulic fluid into the chamber just before an impact stroke. This hydraulic fluid takes up valuable space within the chamber and drastically limits the quantity of energy storing pressure gas the chamber can hold. Thus, a most inefficient use of chamber space is shown in U.S. Pat. No. 3,363,512.

Having reviewed various hydraulically reset piston chambers in this art and their various shortcomings, it is an object of this invention to provide a unique system in which maximum stroking energy is imparted by a minimum sized piston chamber means.

It is a further object of this invention to provide piston chamber means reset by hydraulic power unit means whereby the hydraulic fluid takes up little or no valuable space within the chamber while maximum chamber volume is given to confining pressure gas.

It is another object of the invention to provide means whereby piston chamber stroking energy can be varied and whereby the energy is increased proportionately as more hydraulic fluid is evacuated from the piston chamber by the power unit means.

It is nother object of the invention to provide an adjustable energy piston chamber means operated with hydraulic power unit means in which the end of stroke position of the thrust shaft means varies little and in which the workpiece need not be repositioned as the stroking energy is varied.

It is also an object to provide an adjustable energy system in which the thrust shaft movement before thrust stroke gives an external visual indication of the amount of energy to be imparted.

It is also an object of this invention to provide a safe piston chamber reset by hydraulic power unit means in which no hydraulic fluid is confined in the path of the stroking shaft piston and in which there is thus no danger of bursting the hydraulic power unit components.

It is an object of the invention to provide piston chamber means reset by hydraulic power unit means in which essentially no pressure gas need be bled off or added during repeated cycling.

It is also an object of this invention to provide piston chamber means reset by hydraulic power unit means in which the thrust shaft means can be built to either extend or to retract during an impact stroke.

It is also an object of this invention to provide special piston means capable of overstroking beyond the normal end of stroke position.

These and other objects and advantages become clear from a study of the following specification and appended drawings in which.

Referring now to the piston chamber means presented in U.S. Pat. No. 2,931,218, simply stated, the invention disclosed herein is a unique adaptation of U.S. Pat. No. 2,931,218 for the purpose of securing improvements over the prior art. Study of this previous patent reveals a piston chamber suited for and limited to specialized testing work alone. The means provided by which this piston chamber can be operated and reset is the same as that referred to initially, namely, the costly pressure gas bled off and refill method.

Figure 1:
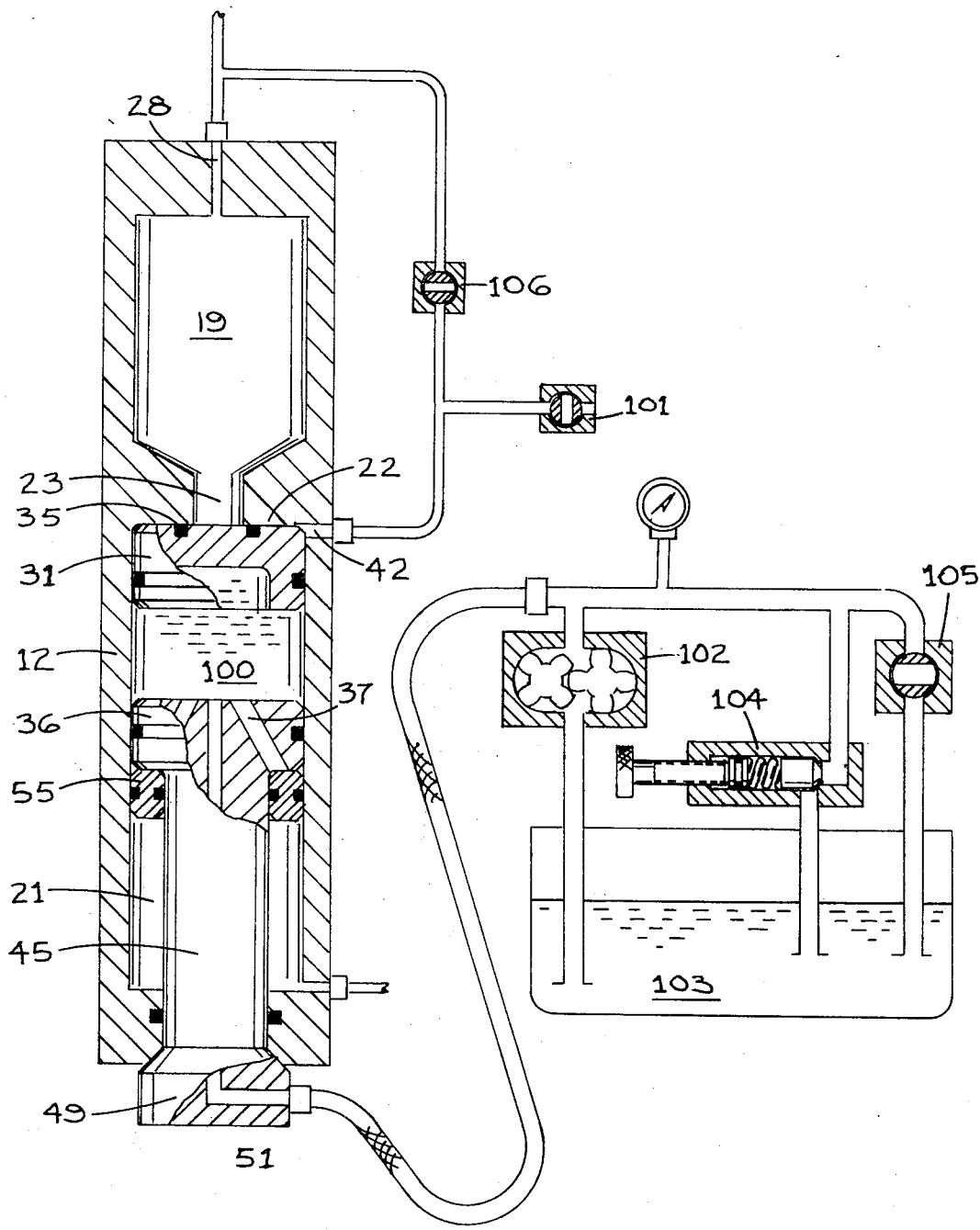
FIG. 1 is an elementary embodiment of the invention.

Referring to FIG. 1 of U.S. Pat. No. 2,931,218, the piston means provided includes members 55 and 36 with thrust shaft 45 attached to it, and an additional piston 31. This piston assemblage reciprocates in a single straight bore cylinder in the forward portion of the chamber and is acted upon by set or cushion pressure gas 22, which surrounds the thrust shaft means and urges the assemblage to retract inward into the chamber. The main body of pressure gas 19 is confined in the chamber to the rear of piston 31. When the piston assemblage is fully retracted, seal means 35 is engaged against orifice plate 22 isolating most of the face area of piston 31 from pressure gas region 19. Port 42 keeps this isolated face area permanently vented to atmosphere while the piston means are in the retracted position.

Before the piston chamber performs a test stroke, region 19 is at a low pressure. The stroke is initiated by refilling pressure gas into region 19 through port 28 to build up the pressure acting on the area inside seal ring 35 until that pressure exerts a greater force on the piston assemblage than does the cushion gas in region 21. This overbalancing of forces eases the piston assemblage forward eliminating the engagement of seal 35 whereupon pressure gas from region 19 rushes over the full piston face area thrusting the piston and thrust shaft suddenly outward.

Once the stroke is initiated, the main pressure gas flowing through orifice 23 is automatically being bled off through permanent vent port 42. And once its outward stroking motion has stopped, the thrust shaft is automatically retracted inward to its beginning position at the urging of cushion gas 21 as pressure gas 19 bleeds off to atmosphere. By this expensive means, the piston chamber is stroked and reset.

The main innovation taught by U.S. Pat. No. 2,931,218 is the confinement of a fixed quantity of hydraulic fluid in the enclosed space between piston 31 and shaft head 36. The patent describes a somewhat limited purpose for this fluid as a yielding thrust modulating means which allows the device to stroke and exert a thrust on some immovable test piece without thrust shaft 45's having to actually move outward. The present invention results when the piston chamber in U.S. Pat. No. 2,931,218 is adapted with some additional equipment in a manner which gives an entirely new and valuable function to the hydraulic fluid within the chamber and which ultimately converts this rather slow cycling test device into a most efficient and effective general duty testing and production thrust tool.

FIRST EMBODIMENT OF THE INVENTION

FIG. 1 appended to this specification shows in simplified form the piston chamber of U.S. Pat. No. 2,931,218 combined with improvidng equipment proposed by the inventor. A first change shown by the inventor in FIG. 1 is to connect a vent control valve 101 to port 42 of the piston chamber. Valve 101 can close when the piston chamber is stroked so that as pressure gas of region 19 expands past orifice 23, it is not automatically vented away and lost, but is conserved within the chamber. Preventing the bleed off of pressure gas 19, however, eliminates the means taught in U.S. Pat. No. 2,931,218 for retracting the piston means after each stroke. This leads to the next step.

In the Ottestadt Patent, hydraulic port 51 in thrust shaft 45 is permanently blocked or plugged and the hydraulic fluid in the chamber is fixed during testing operation. The next alteration proposed by the inventor is to attach hydraulic hose means to port 51 whereby enclosed hydraulic region 100 between the pistons can be permanently communicated with the discharge port of hydraulic pump 102. Now after thrust stroke inner reset piston 31 can be returned to its beginning stroke position using pump 102. Hydraulic fluid now can be pumped from reservoir 103 and added into the chamber expanding region 100 between piston 31 and shaft head 36. Piston 31 is caused to move toward engagement surface 22. Pressure gas 19 which has been prevented from venting away is recompressed as piston 31 moves. After seal 35 has been engaged against surface 22 and the gas in region 19 has returned to its initial pressure, the hydraulic fluid discharging from the continuously running pump 102 circulates back to reservoir 103 through relief valve 104, and pressure is maintained in region 100.

Now the piston chamber is almost ready for another stroke. However, thrust shaft 45 is still in an extended end of stroke position. It will be urged inward by shaft piston 55 only if hydraulic fluid is exhausted from region 100 and only if inner reset piston means 31 simultaneously stays in place against engagement surface 22. To insure the latter, valve 101 controlling port 42 must be opened now to vent off the pressure gas trapped outside seal 35 on the face of inner piston 31. This limits pressure gas 19 to act only on the area inside seal 35 and its force on piston 31 is in this way reduced below the pressure force exerted from the opposite direction by cushion gas in region 21 which is transmitted to piston 31 through the hydraulic fluid in region 100. A net force now holds piston 31 against orifice plate 22. Thus, the venting insures that when the hydraulic exhaust valve 105 is opened taking the pump off pressure inner piston 31 will remain at the beginning stroke position leaving shaft piston 55 free to push inward and displace hydraulic fluid from the chamber. Valve 101 should now reclose port 42 once the hydraulic fluid begins exhausting from the chamber. As shaft piston 55 retracts the thrust shaft inward, cushion gas 21 expands and drops in pressure. The process continues until the cushion gas force transmitted to inner piston 31 falls below the force of pressure gas 19 acting inside seal 35. This unbalancing of forces eases piston 31 with seal 35 away from surface 22. Pressure gas in region 19 is thus released once more onto the full face area of piston 31 exerting a suddenly increased thrust which drives piston 31, the hydraulic fluid in front of it, and in turn thrust shaft 45 outward for a sudden thrust stroke.

The cycle can be repeated over and over again each time pumping hydraulic fluid into the chamber, venting the face of piston 31, and then exhausting the hydraulic fluid out again until the pressure forces unbalance to initiate the next thrust stroke. Thus, is shown a unique hydraulic system for resetting a thrust actuator with only the most negligible venting and loss of pressure gas when valve 101 clears the face of reset piston 31. The pressure gas in region 19 must of course be maintained by adding a small quantity of replenishment gas through port 28 after each venting to prevent the pressure from gradually dropping off as the unit is cycled. The amount of this makeup gas is minute compared with the pressure gas consumed in the old bleed and refill cycling method.

In the hydraulic reset system described so far, the thrust stroke is actually initiated by the retracting motion of thrust shaft 45, which causes the opposed forces exerted on piston 31 by pressure gas 19 and cushion gas 21 to unbalance as the cushion gas expands. So long as the gas charges in regions 19 and 21 are maintained constant, then the distance thrust shaft 45 retracts to unbalance the gas forces is the same for each cycle. The distance of each thrust stroke and the thrust force exerted on the piston assemblage is constant for each stroke. In turn the kinetic energy developed by the thrust shaft before it strikes the workpiece is the same for each stroke. So far then the only means for altering or varying this stroking energy is to change the unbalancing point by bleeding off from or adding gas into the respective gas pressure regions. This is expensive.

The energy of each stroke can be varied without altering the gas charges if the following provision is made in the system. Pressure lines are now provided to connect ports 42 and 28 through an additional gas by-pass valve 106. Valve 106 is normally closed during most of the reset cycle. The gas charges in regions 19 and 21 should be adjusted so as not to unbalance and trigger a stroke even if thrust shaft 45 is retracted almost against its mechanical stop 49. When valve 105 is opened to exhaust hydraulic fluid from region 100, vent valve 101 is simultaneously closed. Now as hydraulic fluid is displaced back to reservoir 103 under the push of shaft piston 55, a thrust stroke can be initiated at the operator's will from any point as the piston retreats by opening valve 106. This circuits pressure gas of region 19 around seal 35 so that the pressure can act on the full face of inner piston 31. The force on the piston assemblage suddenly increases way above the set force of cushion gas 21. Piston 31, the hydraulic fluid in front of it in region 100, and shaft head 36 move outward together. Seal means 35 is carried away from engagement surface 22 freeing pressure gas 19 to rush through orifice 23 and thrust the piston assemblage suddenly outward in an impact stroke. To prevent further exhaust or hydraulic fluid from the chamber once a stroke has been initiated, exhaust valve 105 should be closed as by-pass valve 106 is opened. The pump is thus put into action again immediately as a stroke occurs to pump hydraulic fluid back into region 100 and thereby to urge inner piston 31 toward the engagement surface for another stroke.

Stroking energy was varied in the prior art by varying the piston's end of stroke position. As one can see in the present disclosure, the beginning stroke position of thrust shaft 45 is varied while the end position remains relatively constant. Thus, the thrust shaft can strike the workpiece successively at the same end of stroke position and still deliver varying energy blows. Repositioning of the workpiece from stroke to stroke is not required. Since the stroking energy increases directly with the distance thrust shaft 45 retracts away from the workpiece, the operator is afforded this very visible shaft motion by which to accurately gage and determine the energy of each thrust stroke. The retracting thrust shaft can also be adapted to trip limit switches to open valve 106 automatically and initiate a stroke; accurately repeated sequence of varying energy strokes can easily be obtained in this manner.

It was noted that in some piston chambers of the prior art, the stroking energy is varied or increased by pumping hydraulic fluid into the chamber taking up valuable gas space during the thrust stroke. This is an uneconomical use of chamber space. In the present system, as the stroking energy is increased by retracting the thrust shaft means further inward, the hydraulic fluid is proportionately displaced from the chamber leaving increasingly more volume within the chamber for expansion of pressure gas 19 when the device strokes. This more efficient use of chamber space results in smaller sized piston chambers with higher stroking energy capability.

In most types of impact work shaft head 36 and shaft 45 should be designed with relatively great weight and mass to maximize the kinetic energy it developes during a stroke and thus which it imparts directly upon striking the workpiece. In this system, there are no hydraulic jacks and no hydraulic fluid confined in front in the path of the heavy thrust shaft 45 and shaft piston 55 as the machine strokes. And should an accidental misstroke occur when the workpiece is absent, then the shaft kinetic energy and motion will be absorbed by overcompressing cushion 21, but there is no danger of overpressurizing and bursting the hydraulic power system. The system disclosed herein thus has a safety advantage over many piston chamber systems in the prior art.

The inventor must admit at this point, however, a related problem which the present device does have. Should the thrust shaft impact a very hard workpiece and stop instantly and perhaps even rebound backward, this sudden change of motion is transmitted back through the hydraulic fluid in region 100 to the inner piston 31 which must follow and also suddenly stop or reverse its motion. The kinetic energy of the moving inner piston must be absorbed suddenly, and this causes the pressure of the hydraulic fluid in region 100 to intensify. The problem is kept partly under control by making the inner reset piston as light and hollowed out in shape as possible and out of as light a material as possible—aluminum, for example. By minimizing the inner piston's mass and weight and maximizing the weight of the thrust shaft most of the piston chamber energy is imparted to the latter and there is very little inner piston kinetic energy to be absorbed by the fluid on a hard impact blow.

In the Ottestadt invention, shaft head 36 is specially perforated and ported and shaft piston 55 has movement with respect to the thrust shaft to allow the inner piston 31 to stroke while the thrust shaft 45 remains stationary against the test piece. This special construction is a help in the present invention for the fluid intensification problem we have just cited. Thrust shaft 45 together with shaft head 36 stops short upon striking a workpiece, but shaft piston 55 stays in motion and allows the hydraulic fluid of region 100 to also stay in motion flowing through ports 37 in the halted shaft head 36. The velocity change transmitted by the fluid back to inner piston 31 is thus not as violent as is the thrust shaft's velocity change upon striking the workpiece. Less inner piston kinetic energy is discharged suddenly into the hydraulic fluid and the pressure intensification is thus moderated. It should be noted, however, that some efficiency is sacrificed by the ports in shaft head 36. During the free stroke before the workpiece is struck, some fluid passes through shaft head 36 into the region between itself and shaft piston 55. The fluid is driven, as is the entire piston assemblage, by the difference in gas pressure between regions 19 and 21. The fluid passing through ports 37 during the free stroke constitutes a loss of gas expansion energy reducing the kinetic energy which the thrust shaft can attain. This loss is a function of the size of ports 37.

Summarizing now, the first embodiment illustrates the key elements and main advantages of the invention. The invention consists of a piston chamber used in conjunction with a hydraulic power unit. The piston chamber has a straight bored cylinder portion 12 in which two piston means of identical diameter reciprocate, namely, an inner piston means 31 and a shaft piston means 55. Pressure gas is confined in the chamber and is communicable onto opposite faces of the inner and shaft piston means, and thereby urges these piston means towards each other and simultaneously toward the shaft piston end of the cylinder. The power unit is in hydraulic communication with the enclosed region between the two piston means—region 100—and is adapted to pump hydraulic fluid from its reservoir 103 into this region. The power unit can thereby expand region 100 and compress the confined pressure gas by urging the inner piston to move away from the shaft piston means. As the inner piston approaches its end of the cylinder, it is fitted to sealingly engage a chamber surface 22 at a beginning stroke position. This sealing engagement restricts the communication of pressure gas onto the inner piston face. And means is provided for reducing the pressure gas force on the inner piston face when and only when it is so sealingly engaged with the chamber surface 22. The hydraulic power unit is adapted with valving means 105 to receive hydraulic fluid back into its reservoir 103 from region 100 in the piston chamber. If region 100 is placed in communication with reservoir 103 by this means while inner piston 31 is sealingly engaged and while the force of pressure gas on the inner piston face has been reduced, then the pressure gas which acts on the face of shaft piston 55 causes the shaft piston to move toward the inner piston end of the chamber, displacing hydraulic fluid from region 100 with sufficient pressure to maintain inner piston 31 in its engaged position. By this mechanism the inner and shaft piston means can be removed to beginning stroke positions. The chamber is fitted with a thrust shaft means 45 which has sealed reciprocating entrance from outside the piston chamber to within it. Shaft piston means 55 is adapted to move the thrust shaft means 45 toward the inner piston end of the chamber as it displaces hydraulic fluid from region 100 back to the power unit reservoir. If the inner piston is unbalanced and becomes disengaged from surface 22 when shaft piston 55 is removed toward the inner position end of the chamber, then pressure gas suddenly released thereby over the inner piston face imparts motion to the inner piston, to hydraulic fluid in region 100, and in turn to thrust shaft 45 and shaft piston 55 urging them in a sudden thrust stroke to an end of stroke position at the shaft piston end of the chamber. Pressure gas energy is thus released into kinetic energy of motion which the thrust shaft means can impart in an impact blow against the workpiece outside the chamber.

Variations can be made within the scope of the invention as it has just been summarized. Each of the key elements of the invention is subject to alteration. For instance, various methods can be used by which the hydraulic fluid is communicated into the region between the inner and shaft piston means. The construction of the shaft piston together with the thrust shaft means may reciprocate through either or both ends of the piston chamber. The inner piston may sealingly engage the chamber surface in a number of different fashions. The manner of storing pressure gas in the piston chamber can be varied. The relationship between the main pressure gas communicable over the inner piston face and the cushion gas acting on the shaft piston face is another point for variation. A variety of hydraulic power unit controls can be used. The remaining four embodiments illustrate some of these variations and their special advantages while preserving the basic elements of the invention.

SECOND EMBODIMENT OF THE INVENTION

Figure 2:
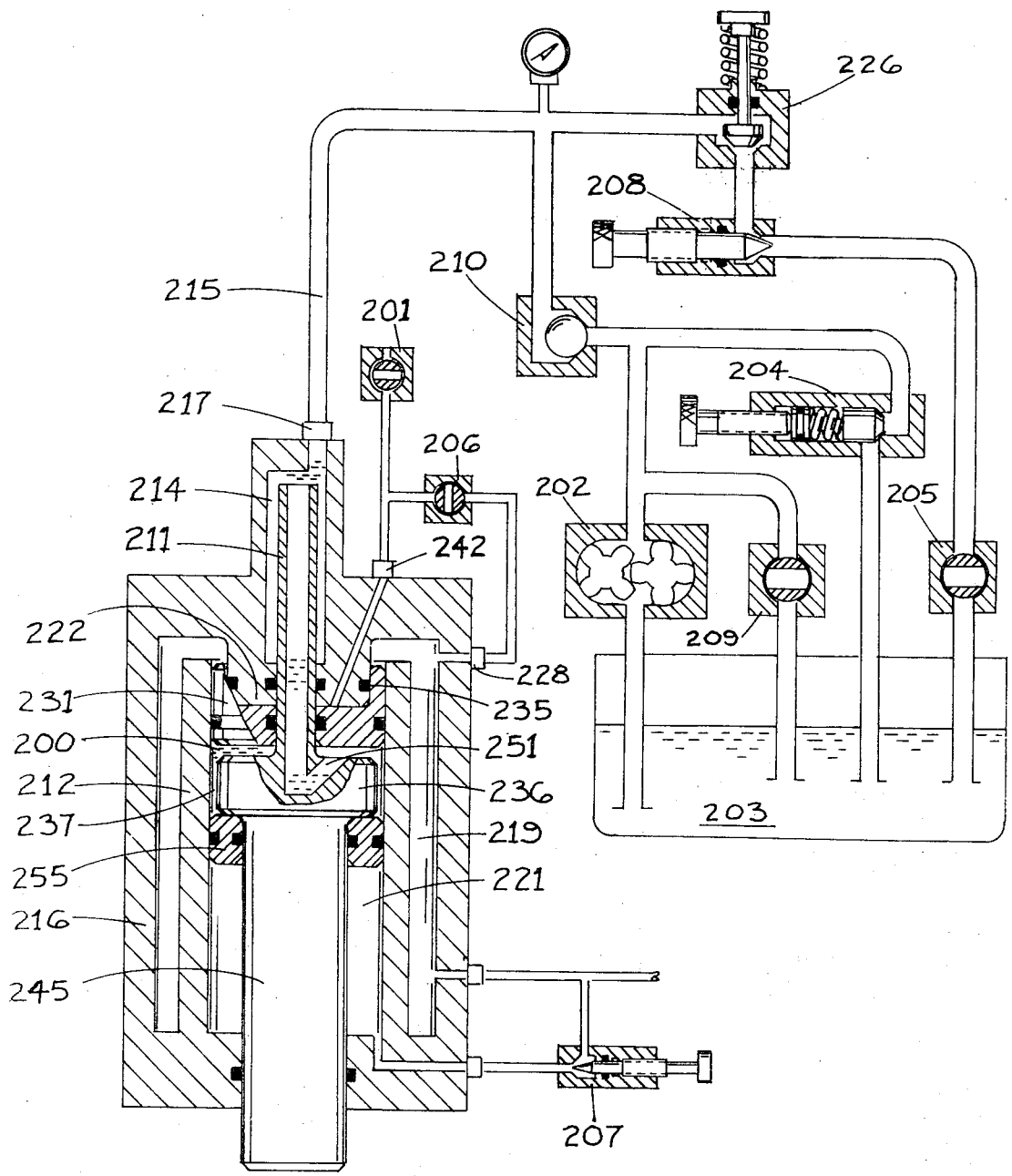
FIG. 2 is a second embodiment showing certain variations and improvements over the first embodiment.

Referring to FIG. 2, one area of variation concerns the thrust shaft means. Again, shaft piston 255 is movable with respect to thrust shaft 245 for the purpose of reducing hydraulic intensification during impact as in the first embodiment. But, in this instance, the ports 37 in the shaft head are eliminated and replaced by a simple clearance space 237 surrounding shaft head 236. During a thrust stroke, the hydraulic fluid of region 200 pushes against shaft head 236 propelling the thrust shaft 245 outward. During free stroke some of the hydraulic fluid circuits past head 236 through the clearance space 237, and some gas expansion energy is not imparted to thrust shaft 245 and is therefore lost. The amount by which impact induced hydraulic shock is dissipated by this mechanism as well as the resulting energy loss is a function of the radial clearance surrounding shaft head 236 in FIG. 2.

In the Ottestadt patent, spacer 49 insures that the thrust shaft and shaft piston do not retreat into the chamber as far as does inner piston 31. Thus, in this way, is determined a fixed minimum amount of hydraulic fluid in region 100. In turn, the distance by which piston 31's stroke and the thrust pulse of the unit exceeds the stroke of the thrust shaft 45 is also determined. Thus, for testing purposes, piston 31 is given more stroking motion than the thrust shaft. And, during a test stroke, much of the energy output of the chamber gas is dissipated internally by forcing the hydraulic fluid to pass through ports 37 in shaft head 36. During such a test stroke, the energy discharged in thrust shaft motion-energy which could perform useful work outside the chamber-is purposely curtailed.

A purpose of the present invention is to provide a general duty thrusting tool in which a maximum amount of energy is released in the form of thrust shaft moving energy. It is not desirable by this standard to have hydraulic losses or for the inner piston to have more displacement than the thrust shaft. Thus, it is not necessary from this point of view to provide the inner piston with extra space through which to stroke. As shown in FIG. 2, thrust shaft 245 has no spacer attached to it. The thrust shaft 245, head 236, and shaft piston 255 can retract fully right against inner piston 231 in its engaged position. Region 200 is not artificially maintained in an expanded condition; and hydraulic fluid isn't allowed to take valuable chamber space. Due to this economy, a scale comparison between FIGS. 1 and 2 shows that while both units have the same thrust shaft stroke, the FIG. 2 piston chamber is significantly more compact.

One observes in the first embodiment that much of the piston chamber's physical length is devoted to confining the main pressure gas in region 19. Besides eliminating excess hydraulic space, the second embodiment takes another step to shorten the chamber's length by relocating the main pressure gas in coaxial region 219. The pressure gas is housed surrounding the piston means along the working length of the chamber outside cylinder 212. This technique is not original with this invention but was first shown in the B. I. Brown U.S. Pat. No. 3,093,117. Though coaxial confinement of the main pressure gas is not an essential element in the present invention, it certainly is a relevant option which has advantages particularly when used in applications where chamber compactness is at a premium. Again, making a scale comparision between the first two figures, it is interesting to note the difference in size. The piston chambers each confine about the same volume of pressure gas, the chambers have identical piston strokes, and thus both chambers have essentially the same thrust energy capability.

In the first embodiment, the main pressure gas has access to the inner piston face through axial orifice 23 in the center of seal engagement surface 22. In the second embodiment, to accommodate its coaxial construction, the surrounding pressure gas of region 219 is given access to inner piston 231 through an annular axial orifice 223 which in this instance surrounds the male chamber engagement surface 222. Inner piston 231 is adapted with a cylindrical cavity so as to become sealingly engaged onto surface 222 isolating the cavity face inside radial seal 235, from the main pressure gas 219, while the annular portion of the piston face outside the seal's diameter remains exposed to pressure. While the isolated portion of the inner piston face is reversed by the second embodiment 41, the mechanics of the balancing pressure forces remains the same as in the first embodiment.

The radial main seal 235 has the advantage that it is easily snapped into its groove and retains itself there during operation and can easily be snapped out of the groove and replaced if it wears out. By comparision, the face seal 35 in FIG. 1 requires permanent bonding to be effectively retained in place. Use of the radial seal in FIG. 2 does, however, trap a large amount of gas inside the seal area which interferes with the piston's fully seating mechanically against surface 222. Valve 206 should be open to allow this trapped gas to escape back to region 219 as the inner piston seats. Thus, when valve 206 closes and valve 201 opens to vent the isolated face area of inner piston 231, a minimum amount of gas is exhausted to atmosphere.

In the first embodiment enclosed hydraulic region 100 inside the chamber communicates with the external hydraulic power unit through a flexible hose attached to port 51 at the external end of shaft 45. This means has several disadvantages depending on the work application. Destructive impact tasks generates shrapnel which can easily cut the hydraulic hose exposed in the work area. The hose takes space in the work area and can interfere with loading and handling of workpieces or general maneuverability of the piston chamber in outdoor mobile work. It is generally desirable to move the hydraulic fluid in and out of the piston chamber as rapidly as possible to get maximum cycling speed. Large hydraulic flows in turn require large hoses. The ability of large commercial hoses and fittings to withstand the repeated impact shock generated at the foot of thrust shaft 45 is questionable.

The coaxial construction of the second embodiment permits a handling of this hydraulic problem from a different direction. Elimination of the central pressure gas orifice 23 allows surface 222 to now be used as a housing for hydraulic delivery means between the power unit and region 200. After an impact stroke, there is an open gas filled space between inner piston 231 and surface 222. To communicate hydraulic fluid from housing surface 222 through this open space and through the inner piston into region 200 requires a delivery tube 211. As shown, this tube is fixed to shaft head 236 and sealingly reciprocates through the center of inner piston 231 and sealingly reciprocates into cavity 214 in housing 222. Hydraulic fluid from region 200 can flow into port 251, up tube 211 into cavity 214, and from there into a power unit hose or piping line which is fixed to port 217 on the chamber body. In this arrangement the hydraulic connection is safely to the rear out of the way of the impact work; and being attached to the chamber body instead of the thrust shaft, the connection doesn't undergo the direct shock of the impact blows.

In the first embodiment of the invention, there is a safety hazard which should be pointed out. When an operator sets out to use the piston chamber, he will fill region 21 with an amount of cushion pressure gas he desires and then close his fill valve fixing the cushion charge. The unit can operate satisfactorily so long as its seals are one hundred per cent effective in holding the cushion gas charge. But, should the seals mounted in shaft piston 55 or the gland seal around shaft 45 begin to slowly leak, a dangerous circumstance arises. At some point the unit might be stroked when no workpiece is present; the kinetic energy of the thrust shaft and shaft piston cannot be sufficiently arrested by the depleted cushion gas, and as a result, the shaft piston means impacts the end housing of the chamber causing mechanical damage to the unit. An aggravating part of this problem is that slow cushion gas leaks are so easy to overlook. It isn't wise to monitor the cushion region with pressure gauges because they can't sustain the extreme pressure peaks that occur in the cushion region.

In the second embodiment of the invention, the cushion gas region 221 is put in constant communication with main pressure gas region 219 through flow control valve 207. This insures that so long as there is main pressure gas to drive the thrust shaft means in an impact stroke, then there is automatically a replenishing supply of cushion gas to absorb the kinetic energy of that stroke if need be. This line connecting the two bodies of pressure gas is large enough to allow sufficient pressure gas 219 to pass into cushion region 221 while the thrust shaft retracts preparatory for a thrust stroke. And, yet the line is restrictive enough to throttle the exit of pressure gas back to region 219. Thus, momentarily enough gas is conserved in region 221 to do the cushioning job.

It should be noted that in order for the thrust shaft to properly retract preparatory for a thrust stroke, then the face area of shaft piston 255 must be greater than the area of inner piston 231 exposed to main pressure gas outside seal 235. The cushion region and main pressure region can now equalize to the same pressure through flow valve 207. The above area relation must be observed to insure once inner reset piston 231 is seated and vented that the net gas force holds the inner piston in place and acts to displace the shaft piston and thrust shaft inward.

One side effect of this innovation is that after an impact stroke the shaft piston 255 comes to rest mechanically abutting the end housing of the chamber. After pressures have equalized through valve 207, pressure gas 219 acts on the larger face of inner piston 231 and in the opposite direction on the smaller area of shaft piston 255. The net force urges the piston assemblage to the very end of its travel after an impact stroke, and region 221 contracts to essentially zero volume. By contrast, in the first embodiment, the fixed charge of cushion gas confined in region 21 builds in pressure as it contracts during a stroke until the force it exerts on the shaft piston 55 balances the force exerted on the inner piston area by the main pressure gas 14. The piston end of stroke position in the first embodiment is determined at the balance point some small distance removed from the mechanical end of shaft piston 55's travel. Region 21 doesn't quite go to zero volume.

Two modes of initiating a thrust stroke are discussed for the first embodiment piston chamber. In one mode a thrust stroke initiates spontaneously when the shaft and shaft piston retract to a point at which the main pressure gas acting on the inner piston face (inside seal 35) overbalances the cushion gas force exerted on the shaft piston. In the other mode of operation, the stroke can be initiated at the operator's will from any retracted position by opening by-pass valve 106. The second embodiment piston chamber means also works in these two modes but with several new results.

After the second embodiment piston chamber has undergone a thrust stroke, hydraulic pump by-pass valve 209 closes causing hydraulic fluid (discharged by the continuously runnng pump 202) to be directed past check valve 210 into region 200 in the chamber. The hydraulic fluid urges inner reset piston 231 to seat against surface 222 engaging radial seal 235. Gas valve 201 closes and valve 206 opens momentarily to vent the cavity face area of the inner piston isolated inside seal 235. Valve 209 reopens and unloads the pump, by-passing the discharge (from the continuously running pump) past relief valve 204 back to the power unit reservoir 203, and the hydraulic fluid in the piston chamber is momentarily trapped there by check valve 210.

From this point onward the mode for initiating a stroke is determined by the adjustment of pneumatic flow control valve 207. Valve 207 may be adjusted to throttle and restrict the flow of pressure gas from main pressure region 219 into cushion region 221. When power unit exhaust valve 205 opens, connecting region 200 with reservoir 203, then main pressure gas passes slowly through flow valve 207 urging the shaft piston and thrust shaft means to retract and displace hydraulic fluid from region 200. The region 200 fluid can displace freely back to reservoir 203 and offers little resistance as the thrust shaft retracts allowing the gas inside region 221 to expand more rapidly than replenishment gas can fill into the cushion region through flow control 207. As a result the cushion pressure in region 221 drops below that of main pressure region 219 as the thrust shaft retracts. At some point, the force which the cushion pressure exerts over the area of shaft piston 255 will decrease below the force of main pressure gas acting on the annular face area of inner piston 231 outside seal 235. Urged by the overbalancing main pressure force, the inner piston will spontaneously disengage from surface 222 and seal 235. The main pressure gas is suddenly released to act on the full face of inner piston 231 urging it, the remaining fluid in region 200, and the thrust shaft means to move in a sudden thrust stroke.

In the first embodiment piston chamber, the energy of such spontaneously initiated strokes could not be varied from stroke to stroke without bleeding or filling the gas charges. In the second embodiment as the thrust shaft and shaft piston means retract, the point at which the forces overbalance can be varied by adjusting flow valve 207. By throttling valve 207 down the pressure in cushion region 221 will drop off more quickly as the shaft piston retracts. The stroking point will be reached sooner and the resulting thrust stroke covering a shorter distance will have less energy. By backing flow valve 207 off, cushion region 221 will be replenished with gas as the thrust shaft means retracts, and the cushion pressure won't drop so quickly. A greater retracting distance is needed to reach the overbalancing condition. The resulting thrust stroke, having greater travel, will have greater energy. Thus is provided the new capability of varying the energy output from stroke to stroke while always retracting the thrust shaft to an overbalanced condition in which the stroke initiates spontaneously.

It should be noted that the energy of any stroke initiated in this spontaneous manner is the maximum energy obtainable at the particular position from which the stroke is initiated. During any impact stroke, the cushion gas in region 221 is suddenly compressed; this syphons off kinetic energy from the stroking thrust shaft. The energy of a stroke is maximized by minimizing the energy absorbed by the cushion gas. This is done by minimizing the amount of cushion gas in region 221 just before a stroke or in other terms minimizing the cushion gas pressure just before a stroke. Now the lowest possible cushion gas pressure just before a stroke is the pressure which is just overbalanced by the main pressure gas acting on the annular area of reset piston 231. No greater stroking energy can be obtained than by retracting the thrust shaft and piston means until the gas forces on it overbalance.

The varying energies which result as flow control 207 is adjusted can also be determined by varying the rate at which hydraulic fluid exhausts from region 200 as the thrust shaft retracts. If this is done, the flow rate of gas into region 221 need not be adjusted. Instead by backing off on hydraulic flow valve 208, the speed at which the thrust shaft and shaft piston retract will be increased. The pace at which cushion region 221 expands will increase with no increase in the rate of replenishment. The pressure in region 221 will fall off more quickly and the overbalancing point at which a stroke is initiated will be reached sooner. A shorter thrust stroke and lower energy result. Conversely by throttling down on valve 208 the hydraulic flow and speed of retraction is decreased. Cushion region 221 expands more slowly and is more fully replenished from the main pressure region. The pressure of expanding region 221 falls more slowly. The overbalancing point is reached later and a longer higher energy impact stroke results. Energy adjustment can be made solely with the hydraulic flow control 208 or solely with the pneumatic flow control 207. It also can be varied by a combination of both adjustments.

One circumstance of this procedure is that at the moment the thrust stroke spontaneously initiates exhaust valve 205 is required to be open. Before the operator has time to react and close the exhaust valve any hydraulic fluid remaining in region 200 will be displaced quickly back to reservoir 203 as the main pressure gas released over its full face propels the inner piston 231 towards the shaft piston 255. Thus, while the operator may be selecting half energy or third energy thrust strokes, a maximum volume of hydraulic fluid exhausts from the chamber and must be pumped back against main gas pressure each cycle. More pumping time is required between strokes, not to mention the waste of energy. To prevent any more hydraulic fluid from exhausting the chamber than is necessary to initiate a thrust stroke spontaneously, a device such as pressure closing valve 226 can be used. The valve poppet is held normally unseated by the valve spring to permit exhaust flow from the chamber at the low hydraulic pressure produced while inner piston 231 is sealed against surface 222. When the stroke initiates, however, raising the hydraulic fluid to the pressure of the main gas region 219, the spring immediately yields as the jump in pressure seats the valve to prevent any further exhaust until the inner piston has been again sealed at its beginning stroke position.

If the hydraulic flow control is throttled down and the pneumatic flow control is conversely backed off, then beyond a certain point of such adjustment regardless of how far the main piston means retracts, the pressure forces do not overbalance to initiate a thrust stroke spontaneously. Replenishing gas passing through the pneumatic flow valve sustains sufficient cushion pressure to hold inner piston 231 clamped in the seated position engaging main seal 235. In this circumstance we resort to the second method of stroke initiation discussed in the first embodiment. When the thrust shaft and shaft piston have retracted the distance the operator desires, he can halt them in the position by closing hydraulic exhaust valve 205. The operator initiates a thrust stroke from this position by opening by-pass valve 206 allowing main pressure gas from region 219 to communicate onto the isolated portion of the inner piston face. Vent valve 201 should be closed at this moment. The main pressure gas, now permitted to act on its full face area, urges inner piston 231 away from chamber surface 222 and once clear of seal 235 propels the inner piston and thrust shaft means in a sudden thrust stroke.

Though there are advantages in certain situations to the operator's initiating the thrust stroke, the second embodiment piston chamber is quite inefficient when operated in this manner. The cushion pressure at the time a stroke is initiated is always above the minimum unbalancing level. And if the operator retracts the shaft piston and thrust shaft slowly enough or pauses in the retracted condition before stroking, that gives time for replenishing pressure gas to equalize the cushion region to the main pressure level of region 219. Thus, when a thrust stroke occurs, the cushion region is at the highest pressure possible; during the stroke that follows the cushion gas syphons off a maximum amount of kinetic energy from the stroking thrust shaft.

Having made note of the changes let us review the key elements and operation of the invention as it is embodied in FIG. 2.

The invention consists of a piston chamber used in conjunction with a hydraulic power unit. The piston chamber has a straight bore cylinder portion 212 in which reciprocates inner piston means 231 and the shaft piston means 255. The inner and shaft piston means have the same sealed diameter. This gives each full travel along their common bored cylinder. Inner piston 231 is mechanically able to close against shaft head 236 at any stroke position. And, on a full energy thrust stroke, no hydraulic fluid is interposed between the piston means, wasting valuable chamber space. Main pressure gas 219 is confined coaxially outside cylinder 212 and inside housing 216. This pressure gas communicates onto the face of inner piston 231 through annular orifice 223 and onto the opposite face of shaft piston 255 through flow valve 207. The piston means are urged towards each other, and because the inner piston 231 has greater total pressure area than shaft piston 255 the pistons are simultaneously urged toward an end of stroke position at the shaft end of the chamber. The power unit is in hydraulic communication with enclosed region 200 confined between the inner and shaft piston means in the chamber. The power unit pump can displace fluid from reservoir 203 through hose means into cavity 214 in housing 222 and through delivery tube 211 into region 200. Region 200 is in this way expanded urging inner piston 231 to move away from shaft piston means 255 and compress the main pressure gas 219. As the inner piston is urged towards its end of the cylinder, it is fitted to sealingly engage chamber engagement surface 222. In this engaged beginning stroke position seal 235 restricts communication of main pressure gas onto the face area of inner piston 231 which is within the diameter of seal 235. Vent valve 201 is provided to eliminate pressure from this isolated area and thus after the pressure gas forces acting on the piston means to hold the inner piston so engaged with seal 235. The hydraulic power unit is adapted with valving means 205 to receive hydraulic fluid back into its reservoir 203 from region 200 in the piston chamber. This allows the cushion pressure gas fed from region 219 to urge shaft piston 255 to move to a beginning stroke position towards the sealingly engaged inner piston 231. The chamber is fitted with a thrust shaft means 245 which has sealed reciprocating entrance from outside the piston chamber to within it. Shaft piston 255 is adapted to press against shaft head 236 and thereby retract the thrust shaft towards the engaged inner piston as region 200 is exhausted of hydraulic fluid. When the net pressure forces unbalance or when the by-pass valve 206 opens, inner piston 231 is caused to disengage from chamber surface 222. The main pressure gas 219 is suddenly released to expand and act on the full face of inner piston means 231 and impart motion to the inner piston means, in turn pushing any hydraulic fluid remaining in region 200 together with the thrust shaft 245 and shaft piston means 255—all moving in a sudden thrust stroke to the end of stroke position. Stored pressure gas energy is thus released into kinetic energy of motion which thrust shaft 245 can impart in an impact blow against a workpiece outside the chamber.

THIRD EMBODIMENT OF THE INVENTION

Figure 3:
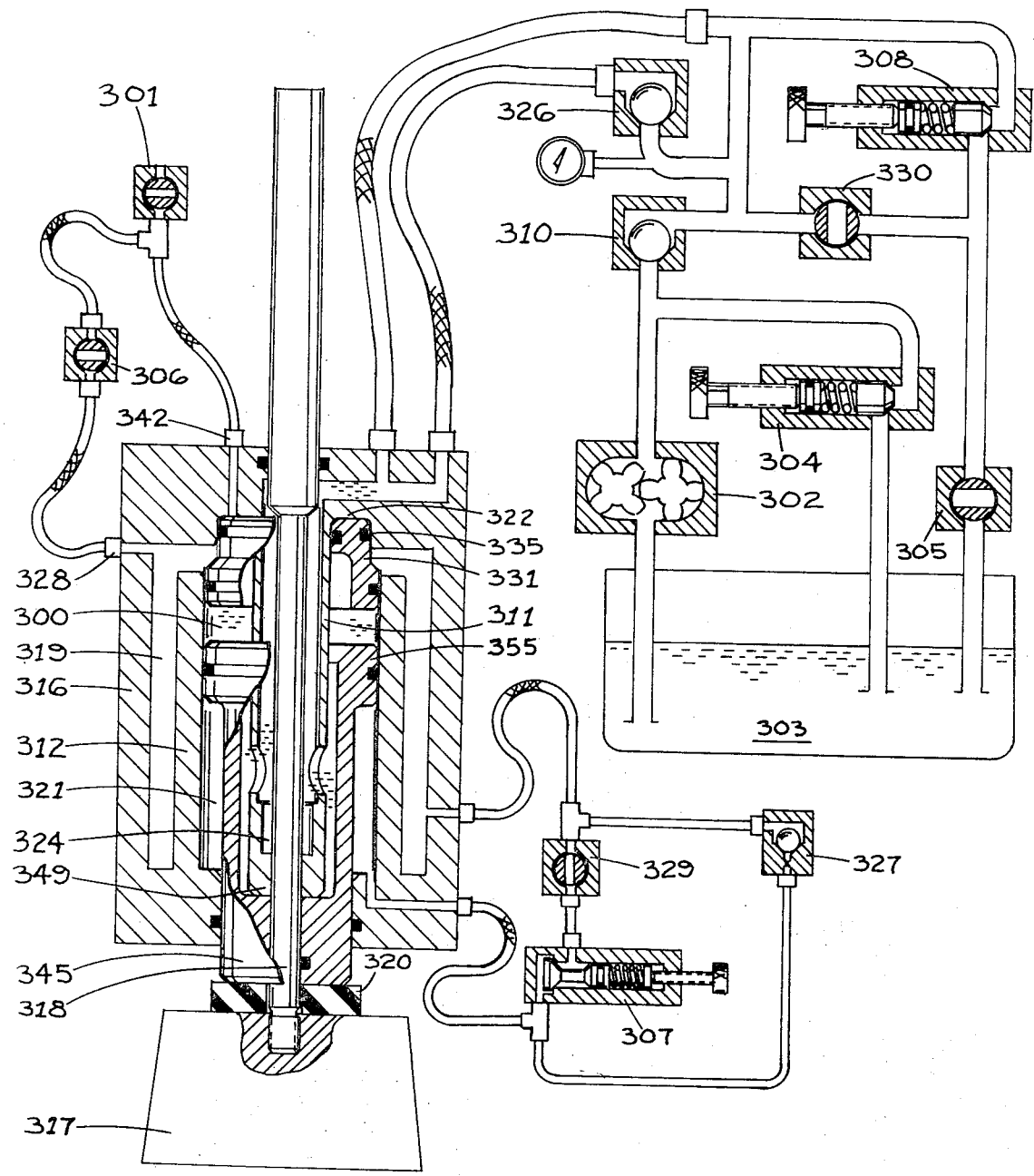
FIG. 3 is a third embodiment illustrating overstroking means.

FIG. 3 shows additional ways in which the key elements of the invention may be treated.

In FIG. 3 shaft piston 355 is shown rigidly attached as a single unit with thrust shaft 345, (similarly to the piston shaft element shown in embodiment five of copending application, Ser. No. 170,599). This is a simplified construction compared to the first two embodiments of the invention having the advantage that no leakage path exists between the two members and one less seal is required. When a thrust stroke is initiated in the third embodiment, the hydraulic fluid in enclosed region 300 is prevented from displacing shaft piston 355 ahead a greater distance than thrust shaft 345 is displaced. Instead the full volumetric expansion of the main pressure gas is transmitted by the enclosed hydraulic fluid to an equal volumetric displacement of the thrust shaft—shaft piston unit. The gas expansion energy is transformed fully into thrust shaft kinetic energy since losses due to hydraulic slippage such as in the first two embodiments cannot occur.

The rigid coupling of thrust shaft 345 to shaft piston 355, while preventing an energy loss and improving the efficiency of the unit, does impose limitations on the mass and weight of inner piston 331. Should thrust shaft 345 be adapted to strike directly against very hard workpieces at each thrust stroke, the thrust shaft will experience sudden stops with possible rebounding from the workpiece. And, thus, also shaft piston 355, the enclosed hydraulic fluid of region 300, and inner piston 331 together are cause to undergo instantaneous reversal of motion. The kinetic energy imparted to the inner piston by the thrust stroke as well as the kinetic energy of its rebound from an impact must be cushioned and absorbed by the hydraulic fluid which produces a momentary hydraulic pressure intensification in the enclosed region 300. To minimize this pressure intensification, the kinetic energy imparted to the inner piston during the thrust stroke must be minimized. The inner piston kinetic energy is in turn minimized by building the inner piston with as little mass and weight as is possible.

The present invention has another area of limitation for which FIG. 3 illustrates a solution. This solution circumvents the thrust shaft's having to strike directly against a workpiece. The hydraulic intensification problem will not exist then for piston chambers adapted with the means next to be discussed. Following each thrust stroke the thrust shaft remains at its extended end of stroke position while hydraulic fluid is being pumped into the unit to recompress the main pressure gas and urge the inner piston means to its beginning stroke position against the chamber engagement surface. If the task being performed requires relocation or replacement of the workpiece in the work area after each impact stroke, such manipulations are delayed and interfered with by the thrust shaft's pausing at the end of stroke position. The thrust actuator in FIG. 3 is adapted with a special overstroking impact head means to overcome this inconvenience.

During a thrust stroke thrust shaft 345 pushes against and propels the mechanically separate overstroking head 317 and its attached auxiliary overstroking shaft 318. The overstroking head 317 should properly be built with much greater mass than the thrust shaft and inner piston means so that most of the gas expansion energy of the stroke is imparted as kinetic energy to overstroking head 317. The piston chamber is properly positioned far enough from the workpiece as to allow manipulation room between head 317 and the work piece when head 317 is against thrust shaft 345 at its end of stroke position. Thus at the end of its thrust stroke thrust shaft 345 has been halted by a cushion pressure build-up in region 321, while the overstroking head 317 upon which the cushion gas does not act remains in motion carrying in its kinetic energy most of the gas expansion output of the chamber and having a working area space yet to cross before striking the workpiece.

Auxiliary overstroking shaft 318 is adapted having sealed reciprocating entrance into enclosed hydraulic region 300 through the exterior end of thrust shaft 345. Within the piston chamber auxiliary shaft 318 changes to a larger diameter section adapted with sealed reciprocating exit through the inner piston end to the exterior of the chamber. Overstroking shaft 318 thus presents an annular pressure face area to the hydraulic fluid of enclosed region 300 which produces a pressure force urging the auxiliary overstroking shaft and its attached overstroking head 317 in direction opposite the thrust stroke. This force through the operating cycle with the hydraulic pressure in region 300, at the moment when overstroking head 317 strikes the workpiece, main pressure gas is freely communicating on the full face area of inner piston 331 at its end of stroke position and is thus pressurizing the region 300 fluid which in turn transmits the pressure against the annular face of auxiliary shaft 318. Thus whether head 317 rebounds or not from the workpiece, the hydraulic force exerted on the overstroking shaft 318 at this moment dominates the halted overstroking head 317 and urges its immediate return away from the workpiece. the overstroking head is instantly retrieved from the work area back to a position against thrust shaft 345 at its extended end of stroke position, the return to this position being cushioned by resilient pad 320.

As has been illustrated, the invention is readily adapted with an overstroking work or impact head with an overstroking auxiliary shaft which permits the head to stroke as far beyond the end of stroke position of the thrust shaft as the distance the thrust shaft strokes and delivers a single work blow after which the head is immediately recalled from the work area to a position against the thrust shaft. Though this added overstroking feature is not intrinsic to the invention, it is a very simple construction compatible with the piston chamber which augments the invention's applicability to many impact tasks. The overstroking capability can also be obtained without recourse to an auxiliary overstroking piston such as 318, but through utilization of the thrust shaft 345 by itself with an overstroking head rigidly attached to it. In such a case, a loose connection would have to be provided between the shaft piston means and thrust shaft means so that the thrust shaft is free to reciprocate further and stay in motion after the shaft piston has reached its end of thrust stroke position and ceased to propel the thrust shaft.

The embodiment in FIG. 3 illustrates a similar method for communicating the hydraulic control unit with the enclosed hydraulic region within the chamber as does the piston chamber shown in FIG. 15 of copending patent application, Ser. No. 170,559. This method again makes use of the chamber engagement surface 322 which the coaxial arrangement makes available. Delivery tube 311 is secured to surface 322 and is oriented to project inward into the chamber where it is provided sealed access through inner reset piston 331 to with enclosed hydraulic region 300. The hydraulic fluid from region 300 can communicate through tube 311 to ports in the inner piston end of the chamber housing and from there through hose or piping means back to the hydraulic control unit.

FIG. 3 illustrates several other functions which can be performed by delivery tube 311 besides communicating hydraulic fluid out of the piston chamber. When a piston chamber is fitted with an overstroking head such as is shown in FIG. 3, one difficulty must be provided for. Should the unit stroke when no workpiece is present against which overstroking head 317 can strike and thereby be halted, then some other means within the piston chamber is needed to absorb the overstroking head's kinetic energy without disabling the unit. In FIG. 3 a hydraulic cushion cavity 324 is provided at the end of delivery tube 311. When the annular pressure face of axuiliary shaft 318 enters cushion 324, the close clearance between the cavity and the shaft cause the hydraulic fluid to be trapped therein at very high pressure which exerts a force decelerating the overstroking head and absorbing its kinetic energy. The cushion cavity may also be located, not on the end of tube 311, but in the extremity of thrust shaft 345. The advantage in putting the cavity in tube 311, however, is that hydraulic fluid, jetting from the cushion through the clearance space between the shaft 318 and tube 311, discharges into region 300 and not against the exit seal in the extremity of thrust shaft 345.

Delivery tube 311 is given another chore in FIG. 3. The problem of hydraulic intensification in region 300 has already been discussed for the case in which thrust shaft 345 is arranged to strike directly against the workpiece. It has been suggested that this problem can be minimized by building inner reset piston 331 as light as possible using a light material such as aluminum. A complimentary precaution against this hydraulic shock is to insure that a certain minimum volume of hydraulic fluid is always present in region 300 during each thrust stroke. While such a precaution compromises the compactness of the piston chamber slightly, the presence of hydraulic fluid, which is a slightly elastic or compressible material, in front of inner piston 331 during a sudden impact stop provides a spring which dampens the deceleration of inner piston 331 and mitigates the pressure induced thereby in the hydraulic fluid. The minimum volume of hydraulic fluid is determined by the location of stop 349 at the end of tube 311 which limits the distance shaft piston 345 can retract toward the inner piston 331 at its beginning stroke position. The stop determines a certain minimum space between the two piston means.

When communicating hydraulic fluid between the piston chamber and the hydraulic control unit, a problem can arise if the physical distance between the two units becomes quite great. If the maximum volume of region 300 within the chamber is less than the volume of hydraulic fluid contained by the pipe or hose line between the piston chamber and the hydraulic control unit, then during cycling the fluid exits the piston chamber into the connecting line and returns from the line into the chamber without ever circulating back to the power unit where cooling means is most conveniently provided. As a result, the danger exists that the hydraulic fluid in the piston chamber will overheat. A method for combating this problem is illustrated in FIG. 3. Two hose lines are provided between the piston chamber means and the hydraulic control unit. Check valve 326 limits flow from the hydraulic control unit to the piston chamber to one hose while permitting return flow back to the control unit reservoir through both hoses. As a result, during cycling the hose connected into check valve 326 is always passing hydraulic fluid in one direction the full distance from the chamber to the control unit. Thus a portion of the fluid is kept circulating instead of simply oscillating back and forth along the connecting line. An additional check valve can be added to the second hose permitting flow only from the control unit to the chamber; in such a case, full circulation of all fluid is obtained.

The manner in which inner piston 331 cooperates with chamber engagement surface 322 is essentially the same in FIG. 3 as the method shown in FIG. 2. The only difference is that the male-female relationship has been reversed; engagement surface 322 in FIG. 3 provides the cylindrical cavity adapted to receive inner piston 331. In FIG. 3, the main seal 335 is a radial member mounted on an outside diameter of inner piston 331. When the inner piston is at its beginning stroke position, main pressure gas in region 319 acts on the annular face area of the piston outside main seal 335. The presence of the main pressure gas force exerted on the inner piston means when it is engaged against surface 322 necessitates that the cushion gas in region 321 exert a force on the shaft piston 355 at least sufficient to overbalance that main pressure gas force in order to maintain inner piston 331 against surface 322 while retracting thrust shaft 345 to its beginning stroke position. If region 321 has insufficient cushion gas to exert this minimum force, the shaft piston and thrust shaft will not retract from their end of stroke point when hydraulic fluid is exhausted from region 300. Instead inner piston 331 will move out of cooperation from surface 322. Thus the annular pressure face of inner piston 331 left exposed to main pressure gas performs a safety function by insuring that the unit does not cycle without sufficient cushion gas.

In the second embodiment a method for replenishing cushion gas from the main body of pressure gas was discussed as well as how the thrust energy of the unit could be varied using a pneumatic flow control. One circumstance of that method is that in order to obtain a maximum thrust energy the thrust stroke must initiate spontaneously as the thrust shaft retracts from its end of stroke position. Thus while it may be desirable in certain work situations, the operator cannot halt the unit in a beginning stroke position and pause before delivering the thrust stroke. Also, the operator must select the thrust energy he desires by making an adjustment of flow controls 207 or 208 without knowing exactly how far the thrust shaft will retract before a thrust stroke spontaneously initiates. When one counts also the erratic effects of the oil temperature and viscosity on the oil flow rate back to reservoir 203, it becomes apparent that while this method of control is useful and effective in coarse work applications exact control of the thrust stroke distance and energy is difficult to obtain.

In FIG. 3 cushion region 321 is again connected to main pressure region 319 to insure sufficient cushion gas is present in the unit at all times. Flow valve 207 is replaced, however, with the parallel connected pressure reducing valve 307 and check valve 327; hydraulic flow valve 208 is replaced by relief valve 308. These new controls permit the operator to halt the thrust shaft at any desired retraced ready to stroke position and pause to judge whether the stroke will give him the energy he needs from the ensuing blow. As in the second embodiment, following a thrust stroke shaft piston 355 comes to rest abutting the end housing of the piston chamber as cushion gas is forced at a restricted rate back to the main pressure region 319 through check valve 327. After inner piston 321 has been hydraulically displaced back to its engaged beginning stroke positon against chamber surface 322, then hydraulic pump 302 can stop turning and the inner piston will be maintained in place by the hydraulic fluid trapped past pump discharge check valve 310. The inner piston face can then be vented by opening valve 301. Relief valve 308 is adjusted to sustain sufficient hydraulic pressure in the chamber to hold inner piston 331 engaged against the force on its annulus of main pressure gas. Pneumatic reducing valve 307 is adjusted to supply gas into the cushion space against shaft piston 355 just sufficient to pressurize enclosed hydraulic region 300 to a level slightly above the setting of relief valve 308. If exhaust valve 305 is opened, pressure gas allowed through reducing valve 307 will cause hydraulic fluid to be displaced from the chamber through relief valve 308 as thrust shaft 345 retracts. There are several ways shown to halt the thrust shaft at a desired beginning stroke position. One way is to close cushion supply valve 329 cutting off the pressure gas to motivate hydraulic fluid through the relief valve 308. Another means is to reclose exhaust valve 305. In either case, after the thrust shaft halts, no further cushion gas can flow into region 321 through check 327 or control 307 so that no matter how long the operator holds the unit in this condition, the energy of the thrust stroke which follows will not in any way change or diminish below the near maximum level for the given position. There is no pressure on the operator's work to stroke the unit prematurely. There are several ways for the operator to initiate a thrust stroke. As in the previous embodiments, vent valve 301 can be closed and bypass valve 306 opened, routing main pressure gas onto the full face of inner piston 331. An alternate means relies on the main pressure gas acting on the annular face alone to disengage the inner piston; if valve 329 is closed, preventing further supply into cushion gas region, then the opening of hydraulic bypass 330 in tandem with exhaust valve 305, permits the hydraulic fluid to issue from enclosed region 300 at a falling pressure as cushion region 321 expands unitl it is overbalanced by the main pressure gas force on the inner piston and the thrust stroke initiates.

If the thrust shaft is allowed to retract full distance to its limiting beginning stroke position against stop 349, then the stroke can be initiated with cushion supply valve 329 open. Since the cushion gas cannot urge the shaft piston to retract any further than permitted by stop 349, at this position the cushion gas ceases to pressurize the hydraulic fluid in enclosed region 300. Thus if valve 330, acting alone, opens, the hydraulic fluid will immediately stop supporting the inner piston against surface 322 and yield to main pressure gas acting on the piston's annular face. As radial seal 335 clears the cylindrical cavity of surface 322 the thrust stroke begins.

If is is desired to cycle the thrust actuator automatically or spontaneously from the maximum energy, maximum stroke position, mechanical stops such as 349 or 149, which halt the shaft piston and thrust shaft some small distance from contact with the engaged inner piston, are very useful. The unit can be cycled with relief bypass 330 and cushion supply valve 329 permanently open. So long as reducing valve 307 keeps pace with the exhausting hydraulic fluid and supplies its full adjusted balancing pressure into region 321, pressurizing the fluid, then inner piston 331 will be held engaged until the thrust shaft retracts against the stop, instantly depressurizing the remaining hydraulic fluid and automatically prompting the next thrust stroke. This mode of operation provides a convenient method for obtaining exact repetition of thrust energy cycle after cycle. If when operating in this mode, it is desired to change the thrust energy occasionally after long periods of repeated cycling, a change of the main pressure gas charge can suffice, bleeding to lower the energy and filling to increase it. If the mechanical stop is adjustable as suggested by threaded nut 49 in the Ottestadt U.S. Pat. No. 2,931,218, then the energy can be increased or decreased by increasing or decreasing the mechanical stroke of the thrust shaft.

If the parallel connecting line with check valve 327 is eliminated, then the cushion gas is trapped in region 321 being given no path through which to meter back to the main pressure region following a thrust stroke. One result in such a case is that the end of stroke position of shaft piston 355 is some small distance removed away from the end housing of the piston chamber due to the buildup under compression of the trapped cushion gas pressure. Due to this circumstance, when the trapped cushion gas begins to expand and retract the thrust shaft to a beginning stroke position, the cushion region pressure ranges well above the minimal setting of pressure reducing valve 307. Thus throughout the retracting step, the cushion gas exerts a force well above the minimum force needed to hold inner piston 331 in cooperation against surface 322. Thus if a thrust stroke is initiated after thrust shaft 345 has retracted a small distance, the energy of the thrust stroke will be much less than the energy of a stroke from the same position when check valve 327 is connected as shown. While the maximum thrust energy capability of the piston chamber is the same whether or not check valve 327 is used, the check valve line does serve to increase the thrust energy of thrust strokes from the less retracted positions. For this reason, use of the check valve line causes the thrust energy to be a more linear function with the retracting distance of the thrust shaft. This characteristic makes the thrust shaft position a much more direct indication for the operator of the thrust energy he is delivering.

It is perhaps relevant to cite the James Kline, U.S. Pat. No. 3,038,450, which also describes a means for replenishing cushion pressure from the main body of pressure gas for reasons of safety. The Kline ratio valve parallels the present use of pressure reducing valve 307. Unlike the pressure reducing valve, however, after the ratio valve functions to replenish the cushion or set pressure region with gas from the main pressure region, the valve can then only be reset for further cycling of the unit by the bleeding or venting off of main pressure gas. In other words, to maintain a safe balance of pressures, main pressure gas must be expelled and lost. In the present disclosure, a method for maintaining a proper balance of pressures has been shown in which main pressure gas is at all times conserved while the pressure forces are balanced solely by allowing flow from the one region into the other.

Summarizing the elements of the invention as embodied in FIG. 3, a thrusting piston chamber is shown in combination with a hydraulic control unit. The piston chamber comprises a shaft piston means 355 and an inner reset piston means 331, each having the same diameter and disposed having sealed reciprocating motion in a straight bored cylinder 312. Inner piston 331 and shaft piston 355 are adapted to close mechanically against each other along a substantial length of the bored cylinder; when the inner piston 331 is at its beginning stroke position, stop 349 prevents the pistons from contacting. Thrust shaft 345 is attached to shaft piston 355 within the chamber and is adapted with sealed reciprocating access to the exterior through the shaft piston end of the piston chamber. Main pressure gas is confined within the piston chamber coaxially surrounding cylinder 312. The main pressure gas can communicate past the end of cylinder 312 onto the face of inner piston 331. It also communicates through reducing valve 307 into cushion region 321 where it can act in opposed direction on shaft piston 355 with the combined effect of urging the two piston means toward each other. Since the pressure face area of inner piston 331 is greater than the underface area of shaft piston 355, a net pressure force urges the two piston means with thrust shaft 345 actuated along to an end of stroke position against the shaft piston end housing of the piston chamber. The hydraulic control unit is in fluid communication with the piston chamber through the two hoses shown. From the hose connection point, hydraulic fluid passes along delivery tube 311 into the space 300 enclosed by cylinder 312 between the inner and shaft piston means. The hydraulic control unit has a hydraulic pump 302 which is adapted to discharge hydraulic fluid into region 300 between the piston means. The pump can thereby expand region 300 compressing the main pressure gas of region 319 and urging the inner piston 331 to a beginning stroke position at its end of the piston chamber. At its beginning stroke position, inner piston 331 sealingly enters a cylindrical cavity in engagement surface 322 where main radial seal 335 isolates pressure gas from the face of said inner piston means which is engaged in the cavity. Vent valve 301 can open only when the inner piston is at its engaged beginning stroke position to eliminate pressure from the inner piston face isolated within main seal 335. This causes a change of the combined pressure forces acting on the inner and shaft piston means. Since the main pressure gas now acts on an annular area of the inner piston, which is smaller than the underface area of shaft piston 355, reducing valve 307 can be set to supply enough cushion pressure in region 321 to urge shaft piston 355 toward inner piston 331 and sustain inner piston 331 at its engaged beginning stroke position. The hydraulic control unit has a reservoir 303. When hydraulic exhaust valve 305 opens, cushion pressure supplied into region 321 through valve 307 is permitted to actuate and displace shaft piston 355 and its attached thrust shaft 345 toward inner piston 331. In this way, thrust shaft 355 is removed to a beginning stroke position and halted there by closing exhaust valve 305 or when an exhaust relief valve such as valve 308 is used, the thrust shaft can be halted by closing cushion supply valve 329. The net pressure gas force on the piston means can be unbalanced by the operator by closing vent valve 301 and opening pressure bypass valve 306 to increase the pressure force on inner piston 331. The net pressure gas force can be unbalanced alternately by opening relief bypass valve 330 together with exhaust 305 if the thrust shaft was halted by closing cushion supply valve 329. This alternate procedure allows the cushion gas to expand and drop in pressure below the level at which the main pressure force is balanced. In either case, inner piston disengages from chamber cavity 322 thereby releasing main pressure gas to expand over the full pressure face of the inner piston and propel the inner piston and shaft piston means in a sudden thrust back to their end of stroke position.

FOURTH EMBODIMENT OF THE INVENTION

Figure 4:
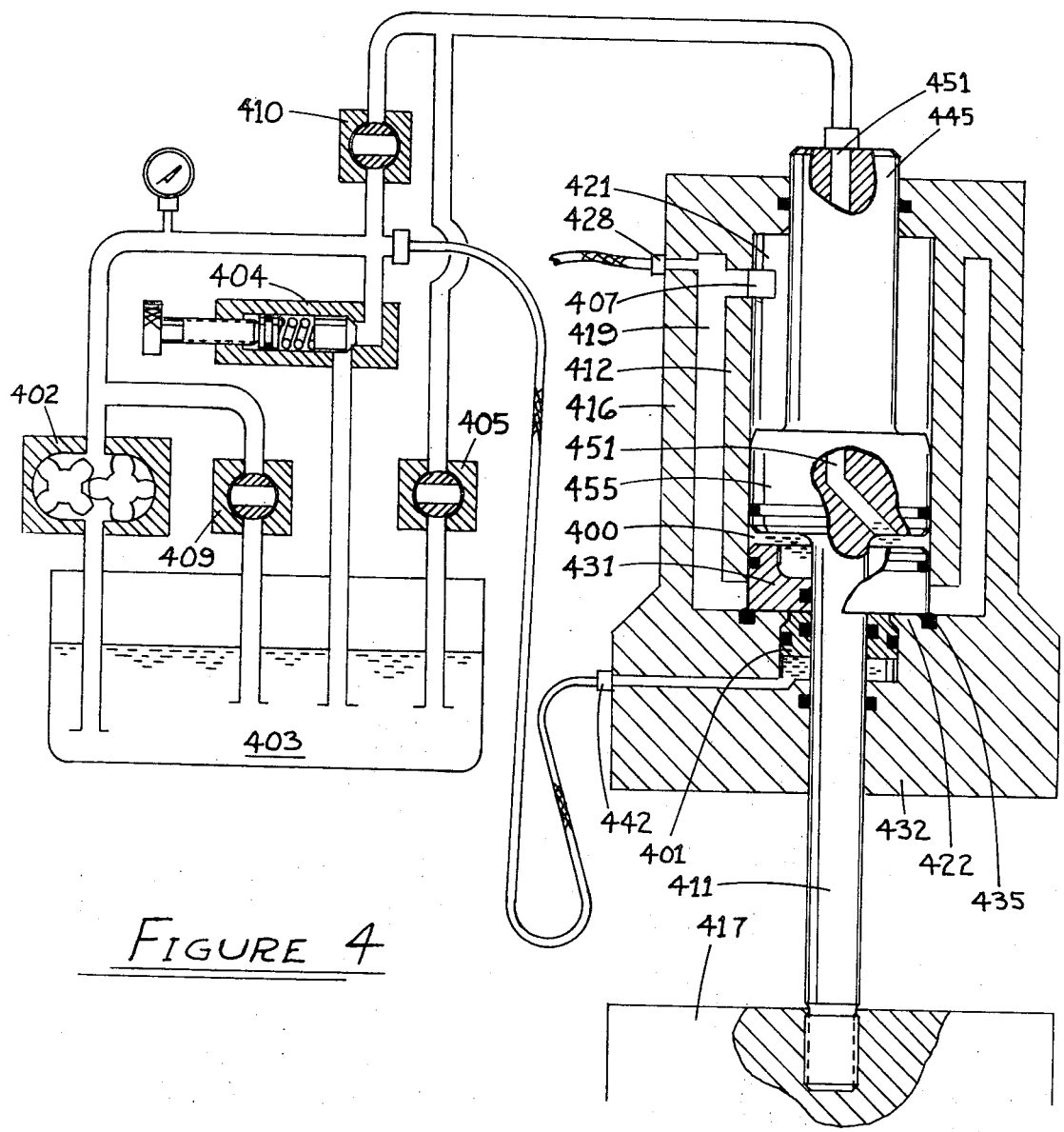
FIG. 4 is a fourth embodiment in which the thrust shaft means is adapted to retract during an impact stroke.

In FIG. 7 of Ottestadt U.S. Pat. No. 2,931,218, shaft piston 73 is shown adapted with a double thrust shaft which has sealed reciprocating exit through both ends of the piston chamber. Ottestadt discusses the utility of this arrangement for conducting tension and compression tests simultaneously. In FIG. 4 of the present disclosure, a similar arrangement is shown. Thrust shaft 411 is attached to shaft piston 455 and is adapted to retract suddenly during a thrust stroke drawing chamber head 432 toward anvil member 417. Thrust shaft 445 is also attached to shaft piston 455 and is oriented to extend suddenly during the thrust stroke. While thrust shaft 455 may be used to perform thrusting or impact work, the shaft is shown in FIG. 4 to illustrate the role it can play in the cycling of the piston chamber. First of all, if thrust shaft 445 is not called up to perform impact work, then it can function conveniently as an out of the work area member providing passage 451 through which hydraulic fluid can be commmunicated to enclosed hydraulic region 400 from the hydraulic control unit.

In the first three embodiments of this invention, a cushion or set pressure region is confined between the shaft piston and its end of the piston chamber. One of the primary functions of this body of gas is to halt the thrust shaft's motion and absorb its kinetic energy. For this reason means were described in the second and third embodiments for supplying main pressure gas into the cushion region to insure that that region always has sufficient pressure gas to fully cushion the thrust energy of the piston chamber. The fourth embodiment takes this a step further and permits the main pressure region 419 to communicate fully and freely to within the shaft piston end of straight bore cylinder 412 through port 407. While this provision guarantees that there is always sufficient pressure gas acting on the cushion face area of shaft piston 455, this pressure gas will not compress substantially during a thrust stroke because the gas can freely exit cylinder 412 through port 407. As such, the gas cannot function as a cushioning means. For this reason shaft piston 455 is built with extra length whereby at the end of a thrust stroke, the piston covers port 407 trapping and compressing pressure gas in cushion cavity 421 thus protecting the unit from damage if a workpiece is absent during a thrust stroke.

In the previous embodiments a portion of the inner piston pressure face is left exposed to main pressure gas when the inner piston is sealed against the chamber engagement surface. This is a safety precaution which insures that when a thrust stroke is intitiated, the cushion gas exerts a counter force on the shaft piston means at least equal to the force exerted by the main pressure gas on the exposed face of the inner piston means. In the fourth embodiment, since port 407 insures that cushion cavity 421 is always fully supplied with pressure gas, this safety precaution from the previous embodiments is no longer critical. Thus when inner piston 431 engages chamber surface 422, main face seal 435 is permitted to isolate the entire face area of the inner piston from the main pressure gas of region 419.

A thrust stroke occurs because of the net force created by the difference in pressure gas forces acting on inner piston 431 and in opposite direction on shaft piston 455. Both these piston means are acted upon by the same body of pressure gas in the fourth embodiment and both piston means have the same diameter. The pressure gas forces are differentiated then by controlling the diameters of thrust shafts 411 and 445 which detract from the pressure areas respectively of the two piston means. While shaft 455 may not be needed to do impact work, its presence in a diameter larger than that of retracting thrust shaft 411 is necessary to limit the cushion face of shift piston 455, a smaller pressure area than the pressure face area of inner piston 451 since both piston means are acted upon by gas of the same pressure.

In the three previous embodiments, when the inner piston means sealingly cooperates with the engagement surface at its beginning stroke position, the pressure on the isolated portion of the inner piston face is reduced by opening a vent valve and blowing the minute amount of pressure gas trapped there by the main seal into the atmosphere. It was noted that this small loss of pressure gas during each cycle has to be compensated for by regularly adding new pressure gas into the chamber to maintain the pressure charge and energy output of the unit constant. The loss of pressure gas due to this cyclically venting is a nuisance and represents a significant cost of operation. Embodiment four presents a gas saving means which circumvents venting to the atmosphere and which has been used previously in this art though it has never been patented. Gas saver piston 401 is adapted with sealed reciprocating motion in a specially bored cavity in the chamber engagement surface 422 inside main seal 435. After a thrust stroke inner piston 431 is caused to move away from shaft piston 455 by closing hydraulic exhaust valve 405, opening hydraulic pump valve 410 and closing pump bypass valve 409. This procedure simultaneously caused hydraulic fluid pressure to be exerted through a separate hose connection to port 442 to hold gas saver piston 401 in a position flush with chamber surface 422 against the main gas pressure of region 419. When inner piston 431 engages seal 435, it also abuts gas saver piston 401 so that only a very minute quantity of pressure gas is isolated within the main seal. At this point, valve 410 can close, locking the hydraulic fluid in the chamber region 400; pump bypass valve 409 can open to relieve pressure from the fluid discharged by the pump and simultaneously eliminate hydraulic pressure from holding gas saver piston 401 against the inner piston 431. The minute pressure gas trapped between the inner and gas saving piston means is hereby freed to displace piston 401 away from the engagement interface expelling hydraulic fluid from the cavity. In this way the isolated pressure gas is allowed to expand which diminishes the pressure force it exerts on the inner piston in the engaged position to a level below the pressure force exerted in the opposite direction on shaft piston 455 by the main body of pressure gas. While no venting has occurred, the force balance has been altered sufficiently such that if hydraulic exhaust valve 405 is now opened, inner piston 431 will remain engaged at its beginning stroke position and will move together with the chamber housing toward the stationary shaft piston 455, and displacing hydraulic fluid from the chamber. The chamber with its impact head 432 can be halted and held in any beginning stroke position relative to shaft piston 455 by reclosing exhaust valve 405. To initiate a stroke, pump bypass valve 409 can be closed, elevating the pump discharge pressure to the pressure setting of relief valve 404. The hydraulic pressure thus developed is communicated against gas saving piston 401 and urges the piston back to the engagement surface interface, recompressing the isolated gas to a pressure level at which a greater pressure force is exerted on the inner piston than is exerted in the opposite direction on shaft piston 455. The chamber engagement surface 422 moves away from the inner piston 431 releasing the main pressure gas to expand therebetween and produce a sudden thrust stroke of chamber head 432 toward anvil 417.

Embodiment four shows then a high velocity thrust actuator comprising a piston chamber means in combination with a hydraulic control unit. Shaft piston 455 and inner piston 431 each have the same diameter and are disposed having sealed reciprocating motion in a straight bored cylinder 412 within the chamber. Thrust shafts 445 and 411 are attached to and actuated by shaft piston 455 within the chamber and are adapted having sealed reciprocating access respectively through each end to the exterior of the chamber. Pressure gas is confined within the piston chamber in coaxial region 419 and is adapted to communicate on the face of inner piston 431 and through port 407. The gas is permitted to freely act in the opposite direction on shaft piston 455, urging the two piston means toward each other. Because thrust shaft 445 has a bigger diameter than retracting thrust shaft 411, the piston means are urged relative to the chamber to an end of stroke position against the shaft piston end of the chamber. The hydraulic control unit is in fluid communication with region 400 enclosed and isolated within straight bored cylinder 412 between the two piston means through passage 451 in thrust shaft 445. The hydraulic control unit has a pump 402, pump bypass valve 409, pump discharge control valve 410, and hydraulic exhaust valve 405. These valving means can be controlled by the operator to direct the fluid discharged by pump 402 into the enclosed region 400 within the chamber. The hydraulic fluid causes region 400 to expand and simultaneously compress the main pressure gas as inner piston 431 is displaced to its beginning stroke position where it sealingly cooperates with engagement surface 422, main seal 435 isolating the full face area of inner piston from the main body of the pressure gas. Hydraulically controlled gas saving piston 401 provides a means whereby the pressure gas isolated on the inner piston face can be permitted to expand and exert a lower pressure force on the inner piston than the main pressure gas force acting in opposite direction on shaft piston 455 thus causing the shaft piston to be urged toward the inner piston and the inner piston to be sustained against engagement surface 422. Hydraulic exhaust valve 405 in the hydraulic control unit is adapted to open at the operator's command permitting hydraulic fluid to exit enclosed region 400 and return into hydraulic reservoir 403 and thereby permitting the main pressure gas force to displace the chamber engaged together with the inner piston 431 in relative motion toward shaft piston 455 to a beginning stroke position at which thrust shaft 411 is extended from and thrust shaft 445 is retracted into the movable chamber. Gas saving piston 401, hydraulically controlled by pump bypass valve 409, can be displaced to compress and thereby raise the pressure of the gas isolated on the inner piston face overbalancing the pressure force exerted between shaft piston 455 and the shaft piston end of the chamber. Chamber surface 422 is thereby induced to disengage from inner piston 431 releasing the main pressure gas to expand and urge the chamber head 432 in a sudden thrust stroke.

FIFTH EMBODIMENT OF THE INVENTION

Figure 5:
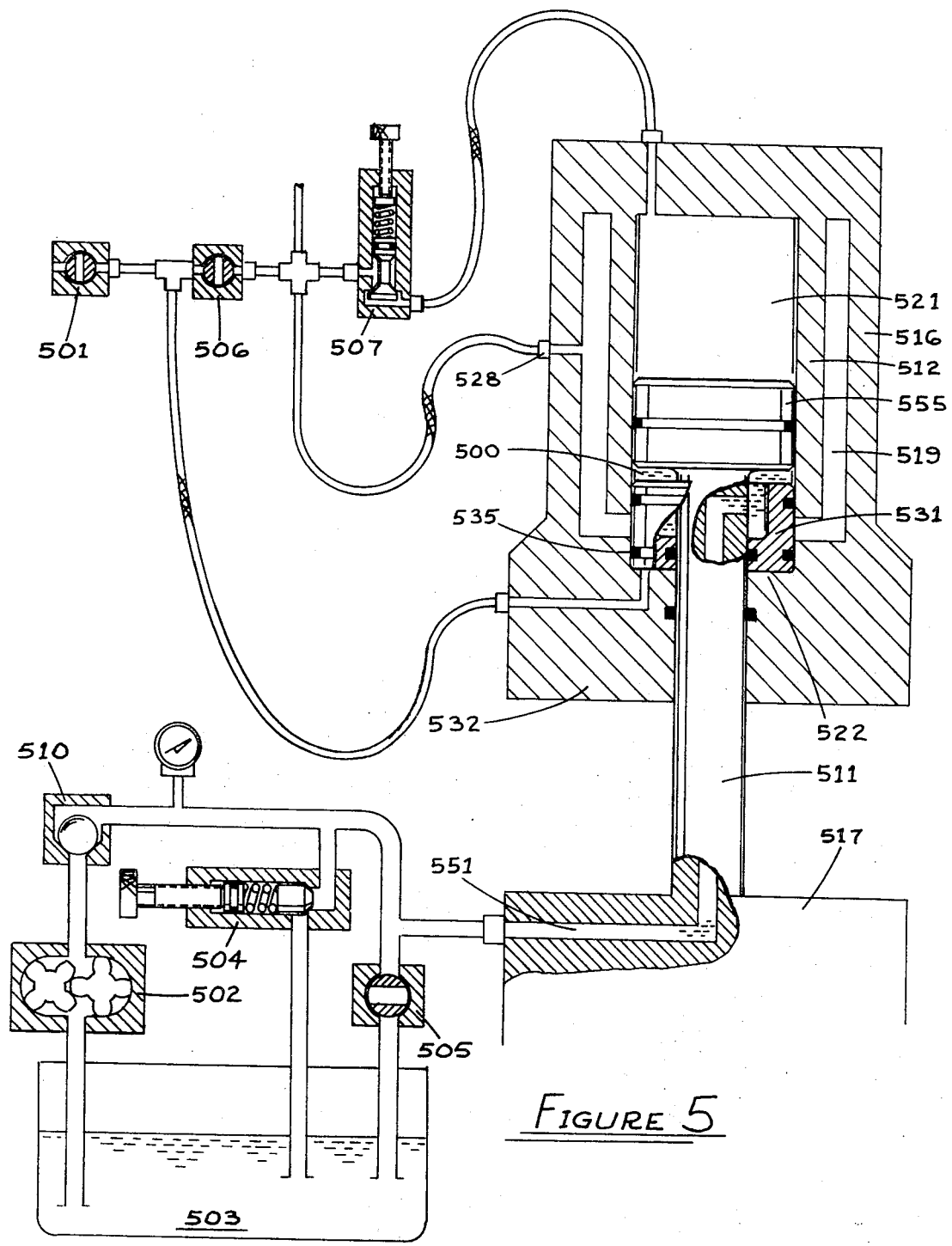
FIG. 5 is a fifth embodiment in which the thrust shaft means retracts during an impact stroke.

Thrust shaft 511 shown in FIG. 5 is attached to shaft piston 555 and is disposed having sealed reciprocating access through inner piston 531 and chamber head 532 at the inner piston end to the exterior of the chamber. Thrust shaft 511 is thus actuated by shaft piston 555 to retract suddenly relative to the chamber during a thrust stroke, drawing chamber head 532 toward an impact against anvil member 517 in a similar adaptation of the invention to the fourth embodiment piston chamber.

Cushion pressure region 521 is fully isolated within straight bored cylinder 512 from the main pressure gas region 519 within the chamber; as in the third embodiment, however, main pressure gas supplies region 521 through an external pneumatic reducing valve 507. As has been noted, the piston chamber can produce a sudden thrust stroke only if a pressure force can be exerted on the inner piston face which is greater than the pressure force acting in the opposite direction of the shaft piston face. This difference in pressure forces is obtained in the fourth embodiment through the use of a dummy thrust shaft 445 to control the piston areas. In the fifth embodiment, the pressure in cushion region 521, which acts on shaft piston 555, is controllable through reducing valve 507 to a range far below the main gas pressure of region 519. As a result, even though the pressure area of shaft piston 555 is greater than the pressure face of inner piston 531 due to the presence of thrust shaft 511, the pressure gas force exerted on the shaft piston can be controlled to much lower at beginning stroke poistions than the main pressure gas force exerted on the inner piston as it disengages from engagement surface 522 for initiation of a thrust stroke. Thus in the fifth embodiment, the net pressure force is not fixed by the piston areas and thus a dummy thrust shaft such as 445 is not required.

FIG. 5 shows radial main seal 535 mounted on the outside wall of inner piston 531 in similar fashion to the main radial seal in FIG. 3. Seal 535, however, is at the full diameter of the inner piston means. Therefore, when the inner piston enters the cylindrical cavity of engagement surface 522, seal 535 isolates the inner piston pressure face area as does the main seal in FIG. 4. In contrast to the fourth embodiment, however, a gas saving piston is not used. Instead a vent valve 501 is again shown which, when opened, completely eliminates any pressure gas force from the entire inner piston face. Thus once the inner piston has been vented at its beginning stroke position, no minimum cushion gas force is needed to sustain the inner piston there engaged.

Thus it is technically possible for the pressure in cushion region 521 to diminish below a safe level so that the cushion gas is insufficient to absorb the full energy of a thrust stroke initiated when a workpiece is absent and if the anvil member is beyond stroking distance of the chamber head. Damaging impact between shaft piston 555 and its end of the chamber might occur. If this danger exists, pneumatic reducing valve 507 must be set and adjusted to supply the minimum safe pressure of gas into the cushion region 521. If there is a possibility that valve 507 can jam closed, then a duplicate reducing valve should be connected in parallel between region 519 and region 521.

If, however, as illustrated in FIG. 5, the anvil member or some work area object is always within striking distance of the chamber head 532, then cushion gas in region 521 is never called upon to absorb the full energy of a thrust stroke. No safety pressure level need be maintained. Since no cushion pressure is required to sustain the inner piston against the chamber engagement surface, the pressure region 521 need be no greater than to just raise the chamber and head 532 against the pull of gravity and displace hydraulic fluid from enclosed region 500 at a reasonable speed, thereby operating to put the shaft piston at a beginning stroke position relative to the chamber. In such a case, the cushion gas absorbs and detracts the least possible energy from the chamber thrust stroke. The energy output and efficiency of a piston chamber can be maximized if the entire face of the inner piston can be fully vented and if there is no danger of the shaft piston's bottoming at the low cushion pressure when a workpiece is absent.

Since no pressure force acts to disengage the inner piston 531 from its vented beginning stroke position, then no matter how low the pressure of cushion region 521 falls, the inner piston remains unaffected against surface 522. Thus a thrust stroke cannot be initiated spontaneously by dropping the cushion region pressure in the fifth embodiment piston chamber. The thrust stroke initiates only in response to operator control when vent 501 closes and pneumatic bypass valve 506 opens directing the force of main pressure gas onto the inner piston face.

As shown, pneumatic reducing valve 507 traps any cushion gas in region 521 preventing its return to main pressure region 519. Thus during a thrust stroke, the trapped cushion gas compresses and increases in pressure. The end of stroke position of shaft piston 555 relative to its end of the chamber housing is determined by the cushion gas being compressed to exert a pressure force on shaft piston 555 equal to the main pressure gas force acting in the opposite direction on inner piston 531. Reducing valve 507 during normal cycling does not pass pressure gas into region 521 except when that region looses gas past the shaft piston seal into the enclosed hydraulic region 500.

To summarize the fifth embodiment, a high velocity thrust actuator comprising a piston chamber means in combination with a hydraulic control unit. Shaft piston means 555 and inner piston 531 each have the same diameter and are disposed having sealed reciprocating motion in straight bored cylinder 512. Thrust shaft 511 is attached to and actuated by shaft piston 555 relative to the chamber and is disposed having sealed reciprocating access through the inner piston end to the exterior of the chamber. Main pressure gas is confined coaxially within the chamber in region 519 surrounding cylinder 512; the main pressure gas can communicate to within cylinder 512 at its inner piston end and therein exert a force over the inner piston face area when it is away from its beginning stroke position. The main pressure gas also communicates through pneumatic reducing valve 507 into cushion region 521 wherein it exerts at reduced pressure a force on the shaft piston 555 lower than and in the opposite direction against the main pressure gas force on inner piston 531. The pressure gas thus urges the inner and shaft piston means toward each other and toward an end of stroke position near the shaft piston end relative to the chamber where region 521 gas is compressed to exert a force balancing the main pressure gas force on the inner piston. The hydraulic control unit is shown connected through hydraulic piping to anvil member 517 and is from there communicated with the region 500 enclosed by straight bore cylinder 512 through passage 551 in thrust shaft 511. The hydraulic control unit comprises pumping means 502 which is adapted to urge hydraulic fluid into enclosed region 500, thereby expanding the enclosed region and simultaneously compressing the main pressure gas as it displaced inner piston 531 toward its end of the chamber to a beginning stroke position in the cylindrical cavity of engagement surface 522 whereupon pump 502 can stop turning. The hydraulic fluid trapped in region 500 by pump check valve 510 sustains the inner piston at its beginning stroke position until pneumatic bypass valve 506 closes thereby cooperating with main seal 535 to isolate the entire inner piston face from the main body of pressure gas whereupon valve 501 opens venting the remaining gas pressure from the isolated face area so that temporarily no pressure force acts to unseat the inner piston from the cylindrical engagement cavity 522 while the remaining cushion pressure force continues to urge the shaft piston 555 toward the inner piston. The hydraulic control unit comprises a hydraulic reservoir 503 adapted to receive hydraulic fluid return from enclosed chamber region 500 when exhaust valve 505 in the hydraulic unit opens permitting the cushion gas in region 521 to expand urging the shaft piston 555 to be moved in relation to the chamber toward the inner piston end as the hydraulic fluid is expended from the chamber. This motion of the shaft piston and attached thrust shaft in relation to the chamber can be halted at, and the members can be sustained at, any beginning stroke position by the reclosing of exhaust valve 505 while pump 502 is not turning. Only by closing pneumatic vent valve 501 and opening pneumatic bypass valve 506 can main pressure gas be reintroduced onto the inner piston face to overbalance the cushion pressure force and urge the inner piston and chamber engagement surface 522 to separate, freeing main pressure gas to expand past main seal 535 onto surface 522 and propel the chamber head 532 in a sudden thrust stroke toward anvil 517.

The inventor has striven to indicate through these five embodiments the variety of ways the invention can be constructed. The invention is, however, by no means limited strictly to the five embodiments shown or to the permutations thereof. For example, to isolate the inner piston face from the main body of pressure gas at the beginning stroke position, other engagement means not shown in the figures can be used. U.S. Pat. No. 3,105,414 by Cvjetkovic and Chanin describes use of an additional floating piston to provide automatic venting of the chamber piston face as it engages in a beginning stroke position. The Cvjetkovic floating piston is also used to mechanically unbalance the chamber piston and push it out of engagement with the chamber main seal thereby initiating a thrust stroke. The Cvjetkovic floating piston or an equivalent member, such as triggering piston 32 shown in Bollar U.S. Pat. No. 3,205,790, fall within the scope of this invention when incorporated in the present invention to vent or mechanically push the inner piston from its engaged position to initiate a thrust stroke. Ottestadt U.S. Pat. No. 2,925,803 and Murek U.S. Pat. No. 2,986,120, as well as FIG. 14 of co-pending patent application 170,599 illustrate various valve or release piston means which can be used in piston chamber actuators. A separate valve piston means of this sort can be applied within the scope of the present invention and used therein as an engagement means to isolate pressure gas on the face of the inner piston means in beginning stroke position from the main body of pressure gas confined within the chamber. Further examples of applicable engagement arrangements can be found in the prior art. These include Ottestadt U.S. Pat. Nos. 3,200,715; 3,202,059; and 2,993,475 and the B. I. Brown U.S. Pat. Nos. 3,093,117 and 3,093,118. FIG. 3 of the Kline U.S. Pat. No. 3,038,450 suggests a variation whereby the inner piston 31 in the present first embodiment can be adapted with a protruding portion to carry a radial seal which can sealingly enter and close orifice 23.

Another area of variation falling within the scope of this invention concerns the manner of constructing the straight bored cylinder means which encloses the chamber hydraulic region between the inner and shaft piston means when main pressure gas is confined coaxially in the chamber. The embodiment shown in FIG. 2 will operate satisfactorily if straight bored cylinder 212 is freed to reciprocate as a unit with shaft piston 255 within the chamber and being attached at its lower end to the shaft piston. This creates within the chamber a single unit cup-shaped shaft piston means inside of which inner piston 231 is adapted to reciprocate. To accommodate the full reciprocating stroke within the chamber of this newly formed shaft piston element, coaxial region 219 would have to be elongated at the inner piston end while preserving the present axial location of engagement surface 222 within the chamber at the end of a chamber extension or boss. Such an arrangement would give main pressure region 219 free access to the underface of this new shaft piston and would thus eliminate the separate cushion region 221.

To keep the piston chamber safe for the occasion when it thrust strokes with no workpiece present, an open cushion cavity similar to cushion 421 would have to be provided in the shaft piston end of the chamber. Such an arrangement has the advantage of simplified construction; a seal and potential leakage point can be eliminated between the two members which are combined hereby. While the chamber must be enlarged somewhat, the added volume allows confinement of a greater volume of main pressure gas in region 219, increasing the energy efficiency of the unit.

Another variation in this vein can be applied to FIG. 4, where cylinder 412 can be detached from the inside walls of the chamber and combined as a one piece unit with inner piston 431. Now a cup-shaped inner piston element is created inside of which shaft piston 455 is disposed to reciprocate. To provide such a cup-shaped inner piston member sufficient reciprocating stroke, the chamber must again be elongated; shaft piston 455 must also be elongated an equal distance. Again such a construction has the advantage of simplicity and the elimination of a seal and potential leakage point as well as increased capacity to confine pressure gas.

Reiterating the advantages of the present invention, it provides a piston chamber powered and controlled by a hydraulic control unit that is capable of cycling rapidly and continuously with little or no loss of pressure gas. The piston chamber is not self-destructive; no hydraulic fluid is confined in the thrust path of the shaft piston means and should the unit stroke prematurely or when no workpiece is present, no damage to the hydraulic system will result. The thrust energy output can be varied from thrust stroke to thrust stroke and is increased directly as the thrust shaft moves away from its end of stroke position before each thrust stroke. The energy of each thrust stroke is increased directly with the amount of hydraulic fluid exhausted from the chamber. This characteristic constitutes the most efficient use of the hydraulic space within the chamber. Except for cases in which mechanical stops sre imposed to limit the shaft piston stroke for considerations of hydraulic intensification, testing procedure, automatic thrust stroke initiation or other reasons, then the shaft piston means can normally close mechanically against the inner piston means at any stroke position due to the use of a straight bored cylinder. Thus hydraulic fluid can be completely exhausted from the chamber before a thrust stroke, and a maximum volume within the chamber can be allotted to the confinement of main pressure gas and to providing the gas space for expansion during each thrust stroke. These design characteristics contribute to give the invention a very high output capacity in comparison with the piston chamber size.

While the five embodiments and the piror art suggest the present invention's principal use to be in the area of impact work, the inventor envisions a more generalized utility encompassing all situations in which sudden rapid motion is required and in which instantaneous transport, relocation, or reorientation of objects and machine parts is of any advantage.

Although specific embodiments of the present invention have been described and illustrated in detail, it is to be clearly understood that the same are by way of illustration and example only; it is to be understood that the invention is not limited to the precise details of construction set forth, but to all variations and modifications as come within the scope of the appended claims.

The embodiments of the invention in which an exclusive property or privilege is claimed are defined as follows:

1. A high velocity thrust actuator comprising a piston chamber means in combination with hydraulic control means, shaft piston means and inner piston means disposed having reciprocating motion along a common axis within said chamber means with cylinder means providing a straight bore portion and disposed surrounding said shaft piston to form an enclosed and sealingly isolated space between said inner and shaft piston means, thrust shaft means actuated with said shaft piston means within said chamber means and adapted for sealed reciprocating access to the exterior of said chamber means, said inner piston means having faces, pressure gas confined within said piston chamber means and operable on the faces of said inner piston means and said shaft piston means whereby said inner and shaft piston means are urged toward each other and are urged with said thrust shaft means to an end of a stroke position away from the inner piston end of said chamber, said hydraulic control means disposed in fluid communication with said enclosed space between said inner and shaft piston means, said hydraulic control means comprising fluid pumping means which cooperates to deliver hydraulic fluid into said enclosed space between said inner and shaft piston means, thereby expanding said space and causing relative piston reciprocation sealingly along said straight bore of said cylinder means through which said inner piston means is displaced to a beginning stroke position at its end of said chamber and through which said confined pressure gas is compressed, engagement means adapted to isolate pressure gas on the faces of said inner piston means from said pressure gas confined in said chamber while said inner piston means is in beginning stroke position, means whereby pressure is reduced on said isolated inner piston face area only while said inner piston is in beginning stroke position, causing said chamber pressure gas to urge said shaft piston means toward said inner piston means and sustaining said inner piston means in beginning stroke position, said hydraulic control means comprising hydraulic exhaust means adapted to allow hydraulic fluid to flow out from said enclosed chamber space between said piston means, whereby said chamber pressure gas is freed to actuate relative piston reciprocation sealingly along said straight bore of said cylinder means through which said shaft piston means is displaced toward said inner piston means and said thrust shaft means is actuated to a beginning stroke position whereat release of said body of confined pressure gas past said engagement means to expand onto the full face of said inner piston means acts in a sudden unbalancing of pressure force to propel said inner and shaft piston means together with said thrust shaft means in a sudden thrust stroke back to said end of stroke position.

2. The high velocity thrust actuator as recited in claim 1 with said hydraulic exhaust means comprising adjustable hydraulic flow valve means whereby the speed with which hydraulic fluid flows out from said enclosed chamber space between said piston means can be varied by the operator.

3. The high velocity thrust actuator recited in claim 1 wherein said hydraulic exhaust means comprises hydraulic reservoir means adapted to receive hydraulic fluid flowing out from said enclosed chamber space between said piston means.

4. The high velocity thrust actuator recited in claim 1 wherein said hydraulic exhaust means comprises hydraulic relief valve means set to open and thereby permit flow of hydraulic fluid out from said enclosed chamber space between said piston means only if the hydraulic pressure in said enclosed space exceeds a determined minimum pressure level.

5. The high velocity thrust actuator recited in claim 1 wherein said hydraulic exhaust means comprises a hydraulic pressure closing valve set to close and thereby prevent flow of hydraulic fluid out from said enclosed chamber space between said piston means if the hydraulic pressure in said enclosed space becomes equal to that of the main body of pressure gas confined in said chamber as can occur when a thrust stroke initiates.

6. The high velocity thrust actuator recited in claim 1 wherein said shaft piston means and said inner piston each have the same greater diameter and are each disposed having sealed reciprocating motion in said straight bore portion of said cylinder means.

7. The high velocity thrust actuator recited in claim 6 wherein said main body of pressure gas is confined within said chamber at the inner piston end in a space aligned along the axis of piston reciprocation and separated from said inner piston means by said engagement means.

8. the high velocity thrust actuator recited in claim 6 wherein a portion of said pressure gas is confined within a chamber coaxially surrounding said straight bore cylinder means with porting means at the inner piston end of said straight bore cylinder means permitting said pressure gas to act on said inner piston means within said straight bore cylinder means.

9. The high velocity thrust actuator recited in claim 6 with a cushion portion of said pressure gas being isolated within said chamber means within said straight bored cylinder means between said shaft piston means and the shaft piston end of said chamber means.

10. The high velocity thrust actuator recited in claim 9 with the remaining main body of said pressure gas being disposed in communication through pneumatic control valve means with said isolated cushion portion of said pressure gas.

11. The high velocity thrust actuator recited in claim 1 wherein said thrust shaft means is rigidly attached and connected with said shaft piston means.

12. The high velocity thrust actuator recited in claim 8 with said thrust shaft means being actuated with said shaft piston means and being disposed having sealed reciprocating access through said inner portion means and through the inner piston end to the exterior of said chamber means,
said thrust shaft means being disposed thereby to retract suddenly relative to said chamber when a thrust stroke is initiated.

13. The high velocity thrust actuator recited in claim 1 with said thrust shaft means being disposed having sealed reciprocating motion with respect to said shaft piston means.

14. The high velocity thrust actuator recited in claim 1 whereby said thrust shaft means, having access to the exterior of said chamber and disposed so as to be actuated together with said shaft piston means, is adapted to overstroke and remain in motion after said shaft piston means has halted at said end of stroke position.

15. The high velocity thrust actuator recited in claim 14 wherein said overstroking shaft means constitutes auxiliary shaft means actuated during a thrust stroke by said thrust shaft means and disposed to overstroke beyond the end of stroke position of said thrust shaft means,
said auxiliary shaft means being urged by pressure fluid to return immediately after overstroking in direction opposite that of said thrust stroke.

16. The high velocity thrust actuator recited in claim 15 wherein said auxiliary overstroking shaft means is disposed having reciprocating motion along the center axis of said piston chamber means and is adapted having sealed reciprocating access through the exterior end of said thrust shaft means to the exterior of said chamber means,
said return of said auxiliary shaft means following a thrust stroke being urged by the pressure of said hydraulic fluid confined in said enclosed space between said piston means in said chamber.

17. The high velocity thrust actuator recited in claim 1 wherein said engagement means comprises chamber engagement surface means with which said inner piston means is adapted to enter into sealing cooperation in beginning stroke position whereby pressure gas is isolated on said inner piston face from the main body of said pressure gas confined within said chamber.

18. The high velocity thrust actuator recited in claim 17 wherein said engagement surface means and said inner piston means are adapted to enter into sealing cooperation whereby pressure gas is isolated on a partial area of said inner piston pressure face from said body of sad confined pressure gas.

19. The high velocity thrust actuator recited in claim 17 wherein said engagement surface means and said inner piston means are adapted to enter into sealing cooperation whereby pressure gas is isolated on the full pressure area of said inner piston face from said body of said confined pressure gas.

20. The high velocity thrust actuator recited in claim 1 whereby pressure is reduced on said isolated face area of said inner piston means only when said inner piston means is at said beginning stroke position by venting said isolated area to atmosphere through pneumatic vent control valve means.

21. The high velocity thrust actuator recited in claim 1 with pneumatic control valve means adapted to introduce gas pressure onto the isolated face area of said inner piston means at beginning stroke position thereby causing said engagement means to release said main body of pressure gas onto the full face of said inner piston means and initiate thrust stroke.

22. The high velocity thrust actuator recited in claim 1 adapted with delivery tube means providing sealed passage for said hydraulic fluid from said enclosed space between said inner and shaft piston means into the inner piston end housing of said chamber means wherefrom said hydraulic fluid is readily communicated with said hydraulic control means.

23. The high velocity thrust actuator recited in claim 1 adapted with mechanical stop means arranged to prevent said shaft piston means from mechanically closing against said inner piston means when said inner piston means is in beginning stroke position.

\* \* \* \* \*